US012263855B2

(12) United States Patent
Dumas et al.

(10) Patent No.: US 12,263,855 B2
(45) Date of Patent: Apr. 1, 2025

(54) METHOD FOR CHECKING THE SUITABILITY OF A TARGET TRAJECTORY FOR TRAJECTORY CONTROL OF A VEHICLE

(71) Applicant: MERCEDES-BENZ GROUP AG, Stuttgart (DE)

(72) Inventors: Florian Bastien Dumas, Herrenberg (DE); Christoph Dörr, Stuttgart (DE); Stefan Sellhusen, Leonberg (DE); Roland Werner, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 223 days.

(21) Appl. No.: 18/016,030

(22) PCT Filed: Jun. 21, 2021

(86) PCT No.: PCT/EP2021/066820
§ 371 (c)(1),
(2) Date: Jan. 13, 2023

(87) PCT Pub. No.: WO2022/012874
PCT Pub. Date: Jan. 20, 2022

(65) Prior Publication Data

US 2023/0286523 A1 Sep. 14, 2023

(30) Foreign Application Priority Data

Jul. 15, 2020 (DE) ..................... 10 2020 118 706.8

(51) Int. Cl.
*B60W 50/12* (2012.01)
*B60W 40/06* (2012.01)
*B60W 40/068* (2012.01)

(52) U.S. Cl.
CPC .......... *B60W 50/12* (2013.01); *B60W 40/068* (2013.01); *B60W 2552/15* (2020.02)

(58) Field of Classification Search
CPC ..... B60W 2050/0026; B60W 2520/10; B60W 2520/105; B60W 2552/15;
(Continued)

(56) References Cited

U.S. PATENT DOCUMENTS 9,731,755 B1 * 8/2017 Moshchuk ............... B62D 6/04
10,589,747 B2 * 3/2020 Plecko ................ B60W 40/076
(Continued)

FOREIGN PATENT DOCUMENTS

DE 10050421 A1 5/2002
DE 102013016434 A1 4/2015
(Continued)

OTHER PUBLICATIONS

Howard et al.; "State Space Sampling of Feasible Motions for High-Performance Mobile Robot Navigation in Complex Environments;" Journal of Field Robotics; Jun. 2008; pp. 325-345; vol. 25, No. 6-7; https://www.ri.cmu.edu/pub_files/pub4/howard_thomas_2008_1/howard_thomas_2008_1.pdf.
(Continued)

*Primary Examiner* — Tyler J Lee
(74) *Attorney, Agent, or Firm* — PATENT PORTFOLIO BUILDERS PLLC

(57) ABSTRACT

A method for checking the suitability of a target trajectory for trajectory control of a vehicle. The target trajectory contains route information about the path of a route to be driven and momentum information about the momentum with which the route should be driven. The target trajectory is assessed as suitable for the trajectory control if the target traction and target tractive power are below a predetermined characteristic traction curve or characteristic tractive power
(Continued)

Figure 1:
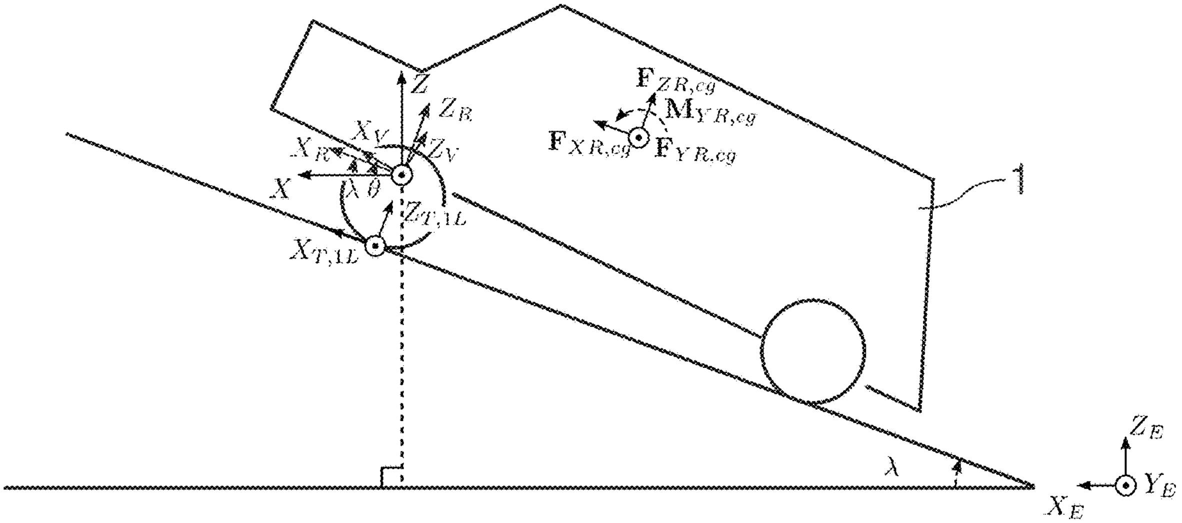

curve, the target steering power is below a predetermined power limit of the steering, and the horizontal target tire forces on each wheel are within the friction value limits determined by the friction value. Otherwise, the target trajectory is assessed to be unsuitable.

10 Claims, 11 Drawing Sheets

(58) Field of Classification Search
CPC ......... B60W 2552/20; B60W 2552/30; B60W 2552/40; B60W 2556/40; B60W 40/068; B60W 50/12; B60W 60/0011
See application file for complete search history.

(56) References Cited

U.S. PATENT DOCUMENTS

| | | | | |
|---|---|---|---|---|
| 2015/0120153 | A1* | 4/2015 | Heim | G06V 20/588 382/103 |
| 2017/0233001 | A1 | 8/2017 | Moshchuk et al. | |
| 2019/0064825 | A1 | 2/2019 | Tschanz et al. | |
| 2019/0092336 | A1* | 3/2019 | Czarnecki | B60W 10/184 |

FOREIGN PATENT DOCUMENTS

| | | | |
|---|---|---|---|
| DE | 102015221612 | A1 | 5/2017 |
| DE | 102018203617 | A1 | 9/2019 |
| EP | 2858060 | A2 | 4/2015 |
| EP | 2862767 | A2 | 4/2015 |

OTHER PUBLICATIONS

International Search Report and Written Opinion mailed Oct. 11, 2021 in related/corresponding International Application No. PCT/EP2021/066820.

Office Action created Feb. 19, 2021 in related/corresponding DE Application No. 10 2020 118 706.8.

Office Action dated Oct. 24, 2024 in related/corresponding KR Application No. 2022-7044321.

* cited by examiner

METHOD FOR CHECKING THE SUITABILITY OF A TARGET TRAJECTORY FOR TRAJECTORY CONTROL OF A VEHICLE

BACKGROUND AND SUMMARY OF THE INVENTION

Exemplary embodiments of the invention relate to a method for checking the suitability of a target trajectory for trajectory control of a vehicle.

In manually driven vehicles, the driver assumes the task of planning the trajectory, i.e., they determine on which route they would like to travel when and at what speed. In planning the trajectory, the driver takes into consideration the characteristics of the road surface in front of the vehicle as well as the acquired knowledge about the vehicle reactions to expect. With this information, the driver plans a trajectory that the vehicle will, according to experience, follow, i.e., the trajectory can be travelled.

DE 100 50 421 A1 discloses a road performance control method of an, in particular, four-wheeled motor vehicle. The potential traction that is available between the wheels and the road surface is detected and is determined by means of a comparison with the likewise detected traction of a traction reserve that is currently being exploited. According to the invention, besides the forces acting in the horizontal plane, the vertical movements of the motor vehicle structure compared to the wheels are additionally taken into consideration during the determining of the traction reserve. Preferably, the maximum horizontal force that can be transferred by the wheel tires is detected by means of multiplying the wheel load orientated in the vertical direction with a value of the friction between the wheel tires and the road surface, which is estimated or detected by means of a sensor, from which horizontal force the traction reserves in the longitudinal direction of the vehicle and in the transverse direction of the vehicle and in the vertical direction are detected, with the suitably estimated current values for the longitudinal force and lateral force acting in the horizontal plane. The detected traction reserves can then be communicated to a so-called traction controller, which arranges a favorable use of the current available traction, taking into consideration the desired driving maneuver.

Exemplary embodiments of the invention are directed to an improved method for checking the suitability of a target trajectory for trajectory control of a vehicle.

In a method according to the invention for checking the suitability of a target trajectory for trajectory control of a vehicle, the target trajectory contains route information about the path of a route to be driven and momentum information about the momentum with which the route should be driven. According to the invention, a slope, a transverse incline, and a friction value of a road surface along the target trajectory are detected and/or estimated by sensors and/or from map data. If some values cannot be detected by sensors, these are, for example, taken from map data. If the values cannot be either directly measured, nor taken directly from map data, then the values are estimated, for example based on sensor information or map data. Target values, required for driving the target trajectory, of target traction, target tractive power, target steering power, and horizontal target tire forces on individual wheels of the vehicle are calculated based on model equations of the vehicle from the route and momentum information about the target trajectory and from the detected slope and transverse incline, wherein the target trajectory is assessed as suitable for the trajectory control if:

- the target traction and target tractive power are below a predetermined characteristic traction curve or characteristic tractive power curve,
- the target steering power is below a predetermined power limit of the steering and
- the horizontal target tire forces on each wheel are within the friction value limits determined by the friction value, wherein the target trajectory is otherwise assessed to be unsuitable.

In an embodiment, the method is used on every target trajectory from a predetermined plurality of target trajectories.

In an embodiment, every target trajectory assessed as unsuitable is rejected as invalid.

In an embodiment, the characteristic traction curve and the characteristic tractive power curve are taken from respective look-up tables.

In an embodiment, the characteristic traction curve and the characteristic tractive power curve take into consideration occurrences of degradation of a drive train.

In an embodiment, a quantitative assessment of the exploitation of the potential friction value is carried out.

In an embodiment, occurrences of degradation of a steering actuator are taken into consideration.

In an embodiment, the model equations of the vehicle rely on a quasi-steady-state modelling approach.

In an embodiment, in a first step, a conversion of parameters of the target trajectory as well as of the slope and transverse incline into vehicle parameters is carried out by means of the model equations.

In an embodiment, the target traction and the target tractive power for a center of gravity of the vehicle are calculated.

The proposed invention solves the problem of determining drivability for autonomous vehicles.

The invention relates to a method for checking the suitability of a target trajectory for trajectory control of a vehicle, wherein the target trajectory contains route information about the path of a route to be driven (target position, target camber, target change in camber) and momentum information about the momentum (target speed, target acceleration) with which the route should be driven.

According to the invention, the slope $\lambda$, the transverse incline $\eta$, and the friction value $\mu_{max}$ of the road surface along the target trajectory are detected or estimated (by sensors or from map data). Furthermore, the target values, required for driving the target trajectory, of the driving force (target traction $F_{traction,demand}$), of the driving power (target tractive power $P_{traction,demand}$), of the steering power (target steering power $P_{steering,max}$), and the horizontal target tire forces on the individual wheels (longitudinal target tire forces $F_{XT,i}$, transverse target tire forces $F_{YT,i}$) are calculated based on model equations of the vehicle from the route and momentum information about the target trajectory and from the detected slope $\lambda$ and transverse incline $\eta$. The target trajectory is assessed as suitable for the trajectory control if a test shows that

- the target traction and target tractive power are below a predetermined characteristic traction curve or characteristic tractive power curve,
- the target steering power is below a predetermined power limit of the steering and the horizontal target tire forces on each wheel are within the friction value limits determined by the friction value $\mu_{max}$ (maximum available potential traction, traction ellipse).

Otherwise, the target trajectory is assessed as unsuitable for the trajectory control. Advantageously, the method is used on every target trajectory from a predetermined plurality of target trajectories. Every target trajectory assessed as unsuitable is rejected as invalid. The characteristic traction curve and the characteristic tractive power curve are advantageously taken from a look-up table and take into consideration possible occurrences of degradation.

The invention further relates to a device that is configured to carry out a method as described above. In particular, the device can comprise a data processing device, for example a control unit in a motor vehicle.

BRIEF DESCRIPTION OF THE DRAWING FIGURES

Exemplary embodiments of the invention are described in more detail in the following, using drawings.

Figure 2:
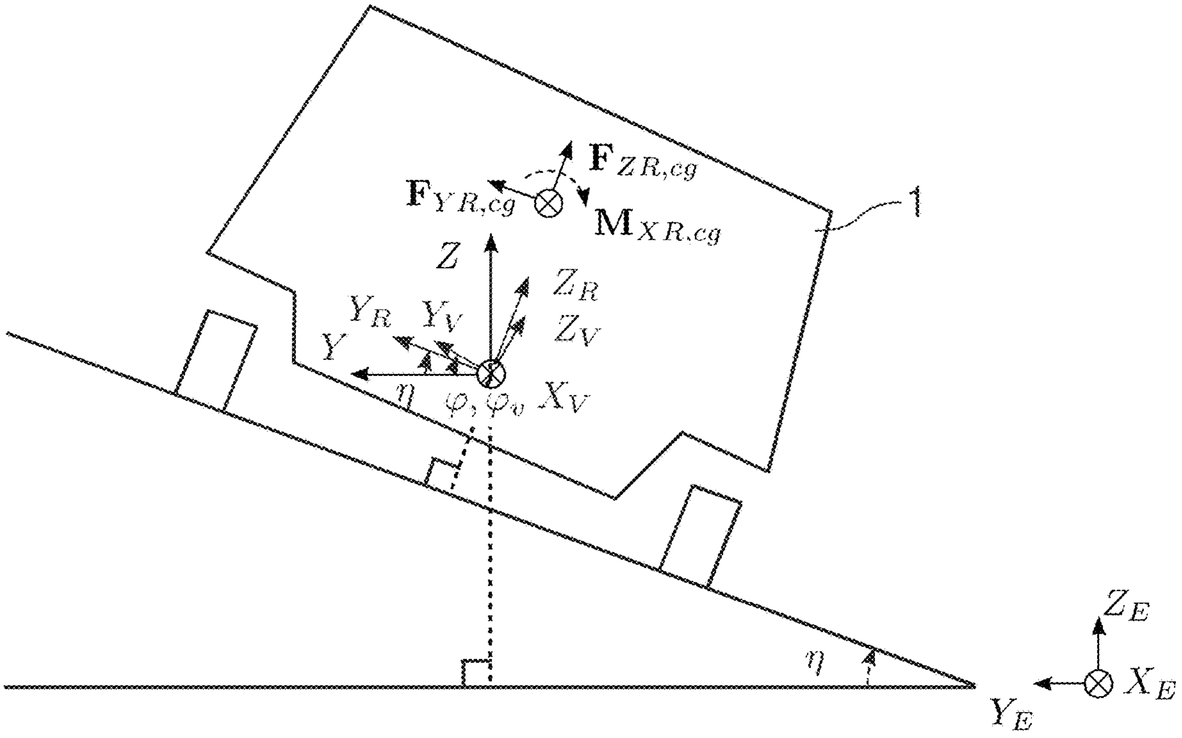
Figure 3:
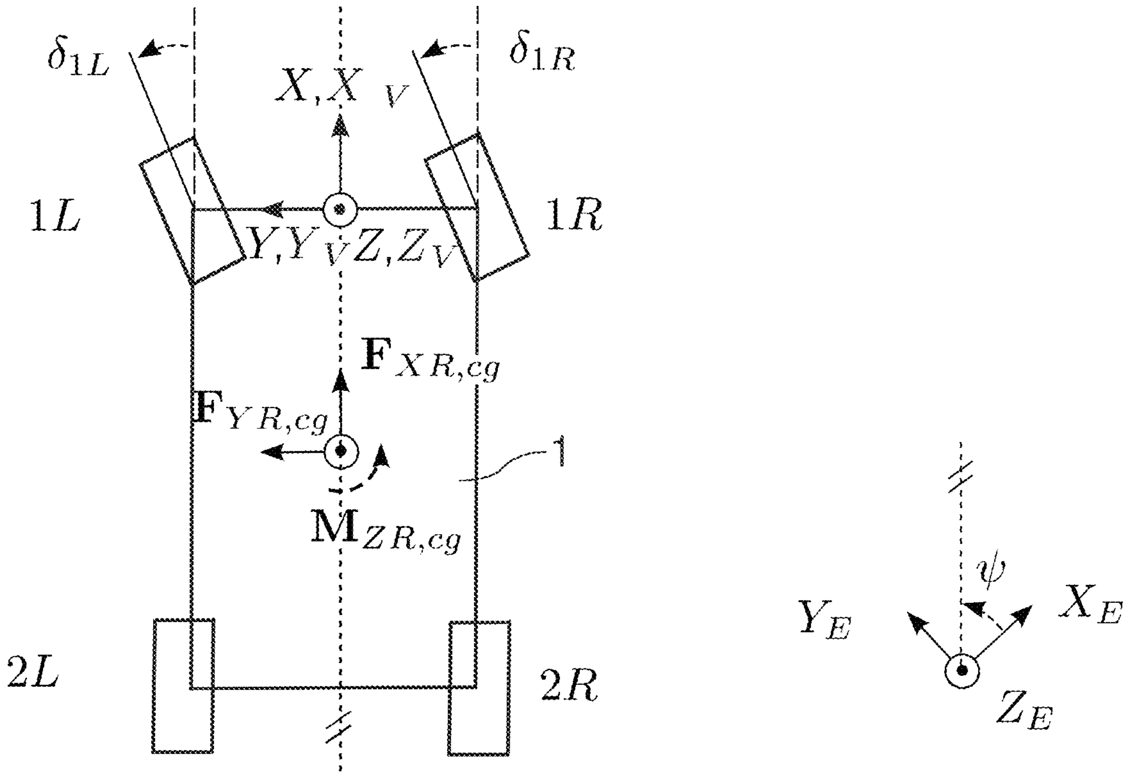
Figure 4:
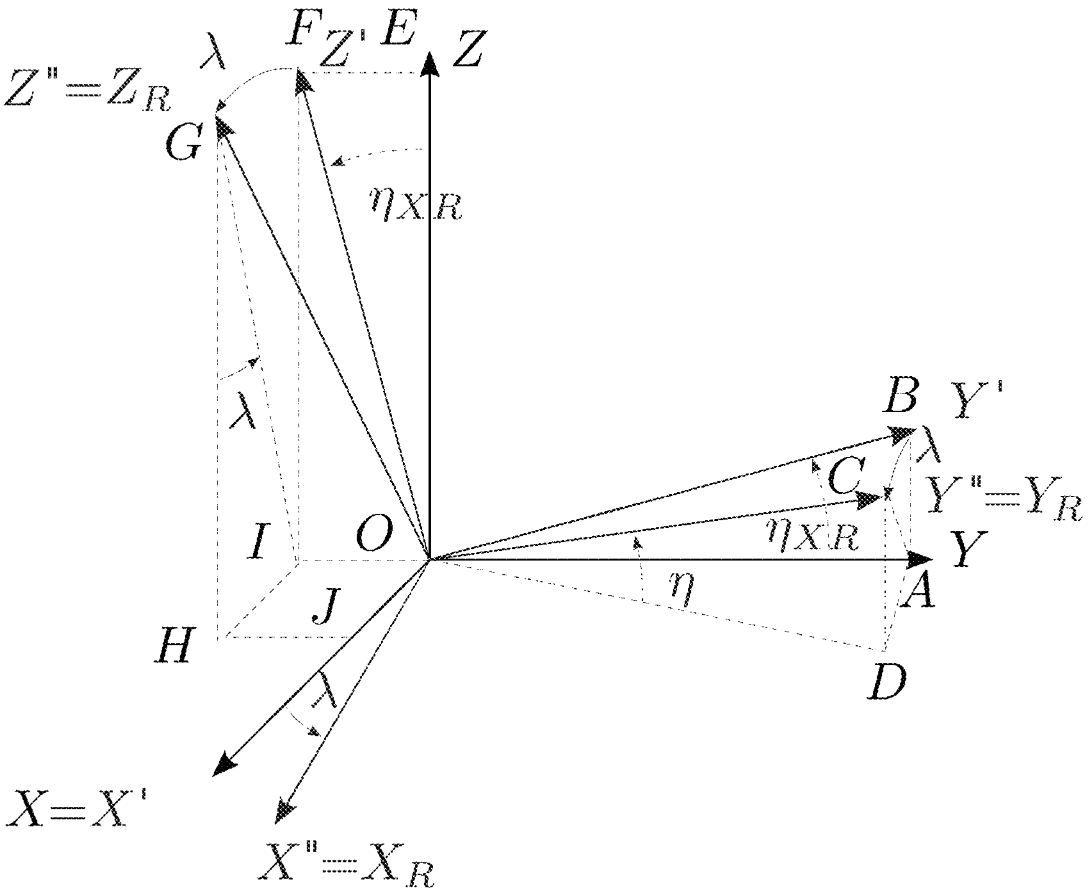
Figure 5:
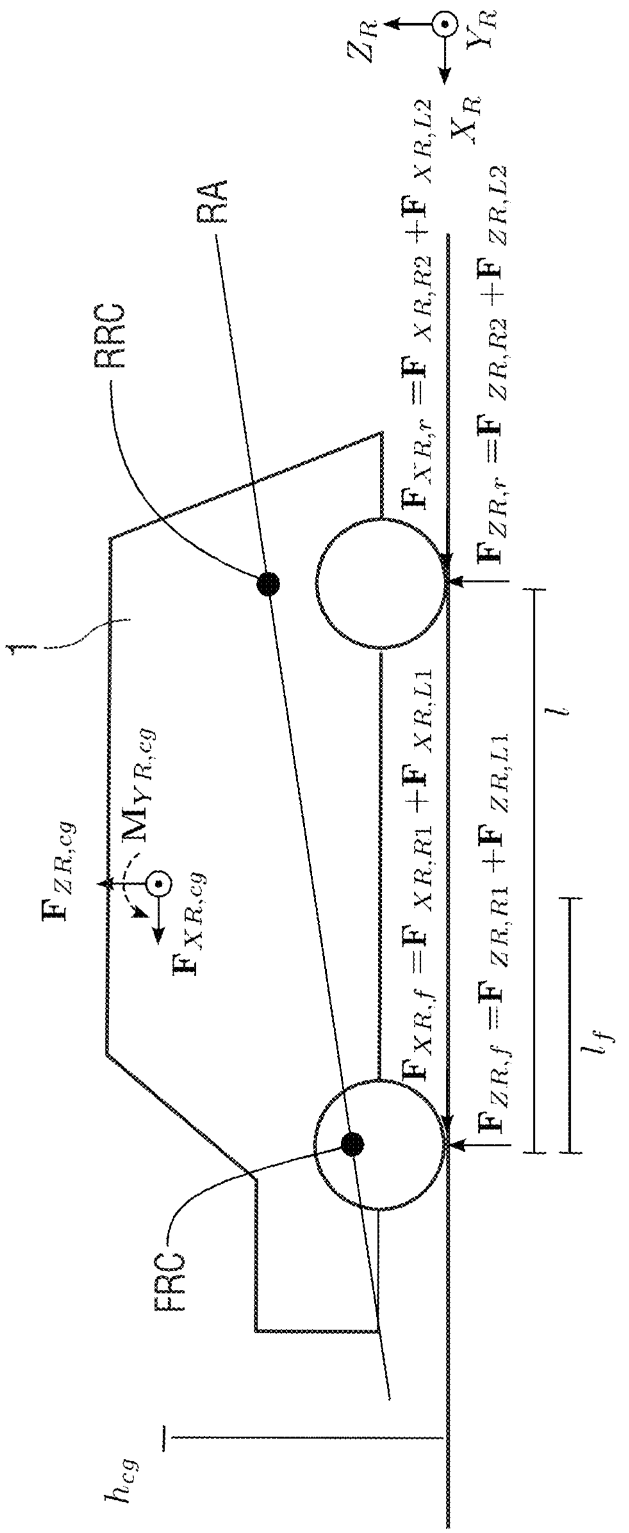
Figure 6:
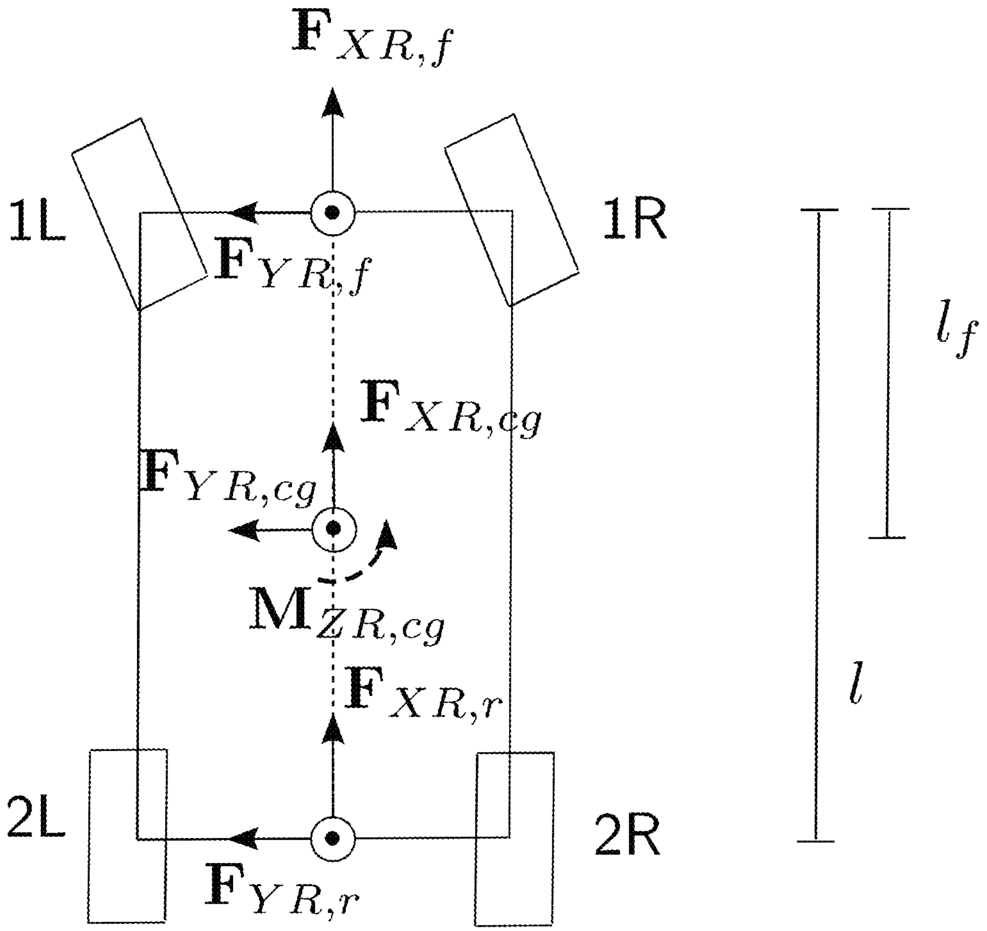
Figure 7:
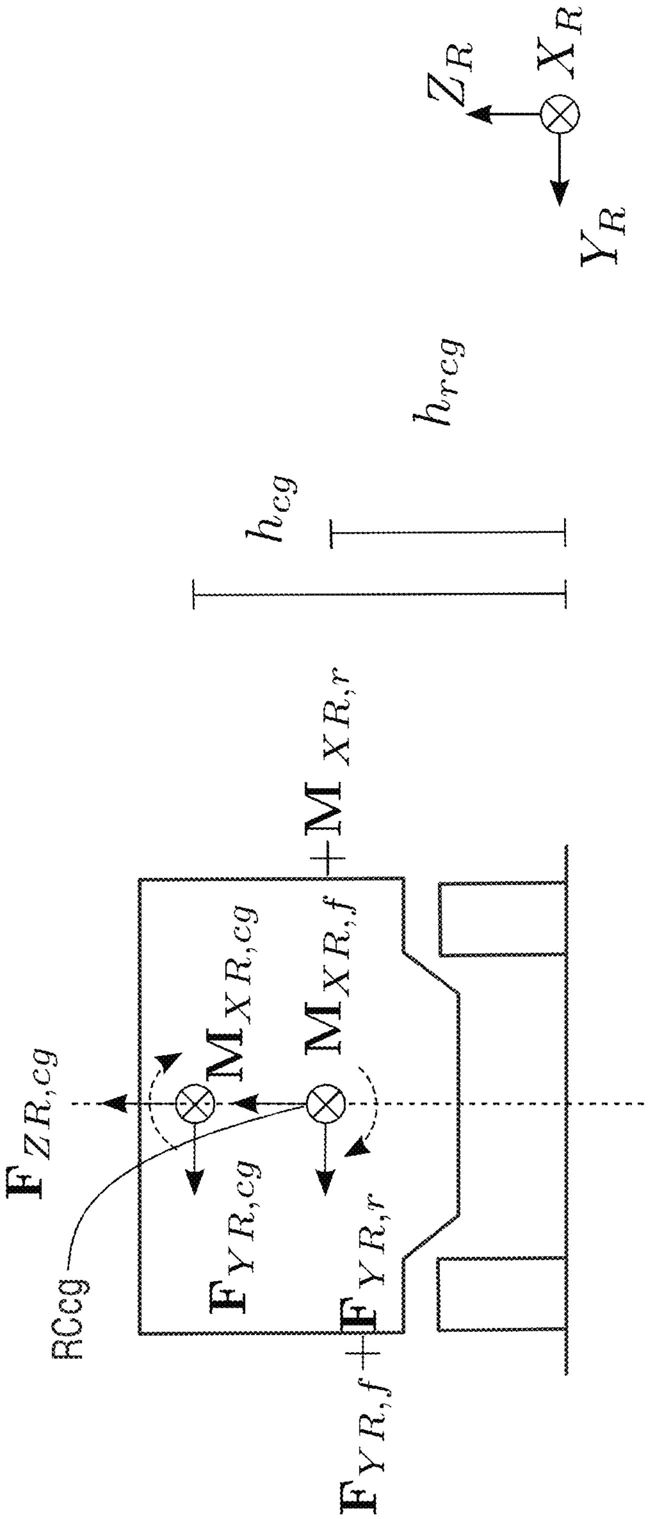
Figure 8:
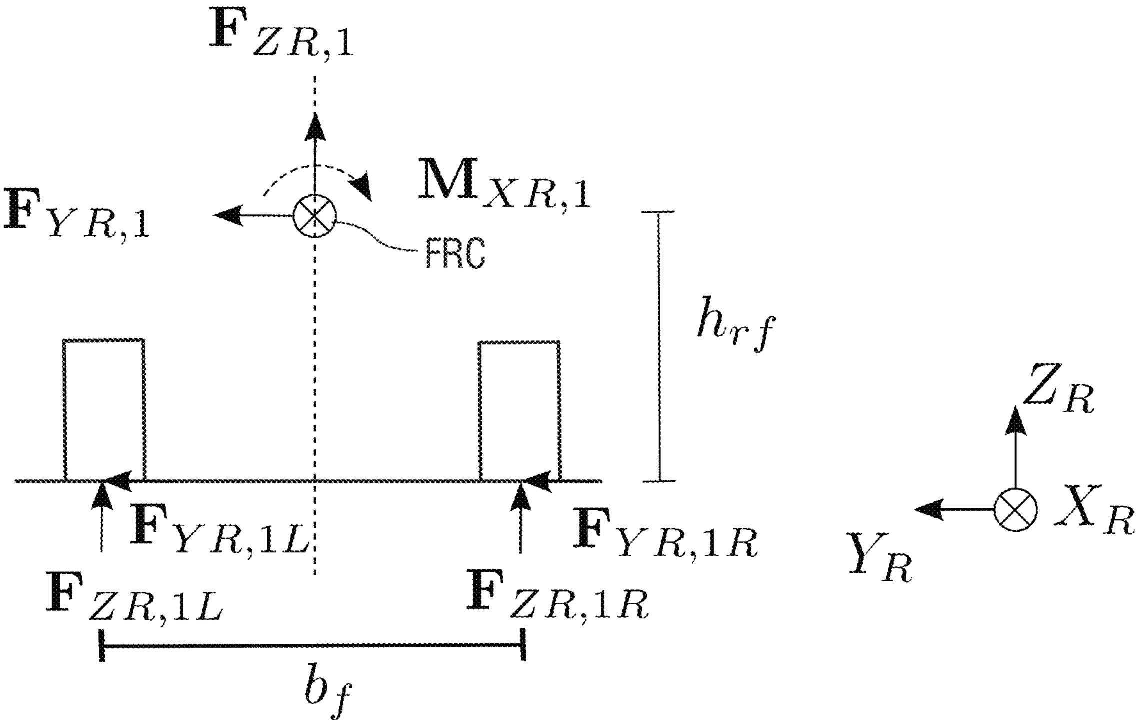
Figure 9:
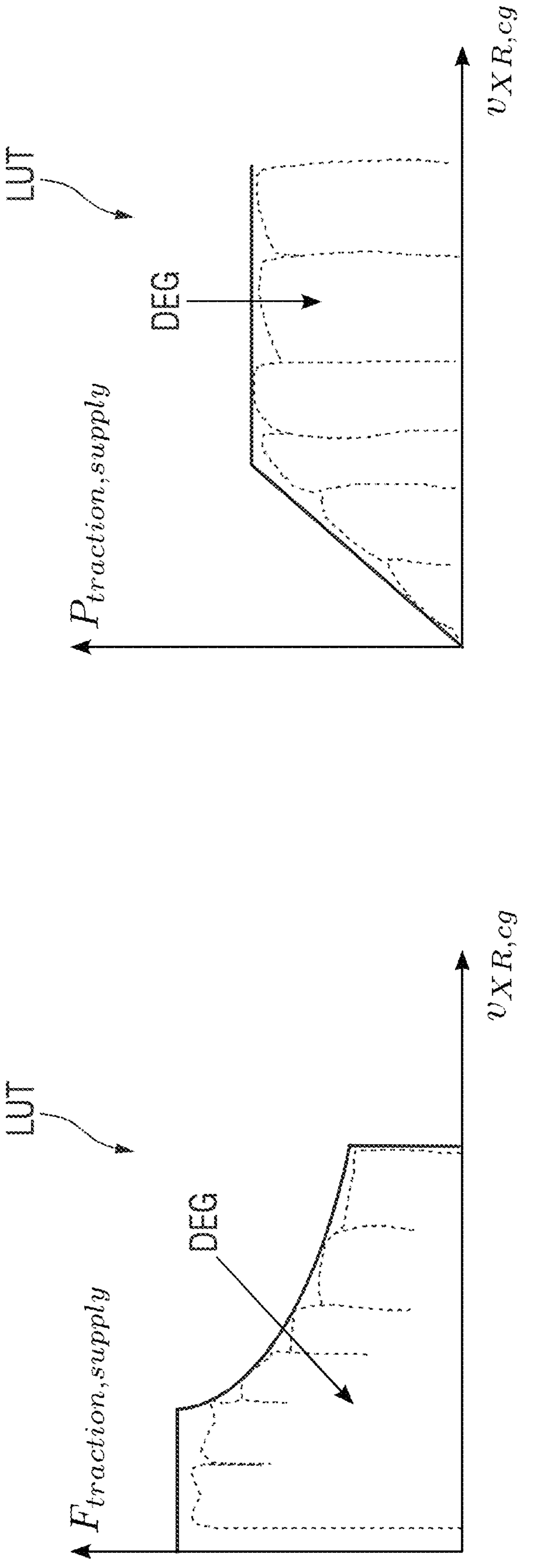
Figure 10:
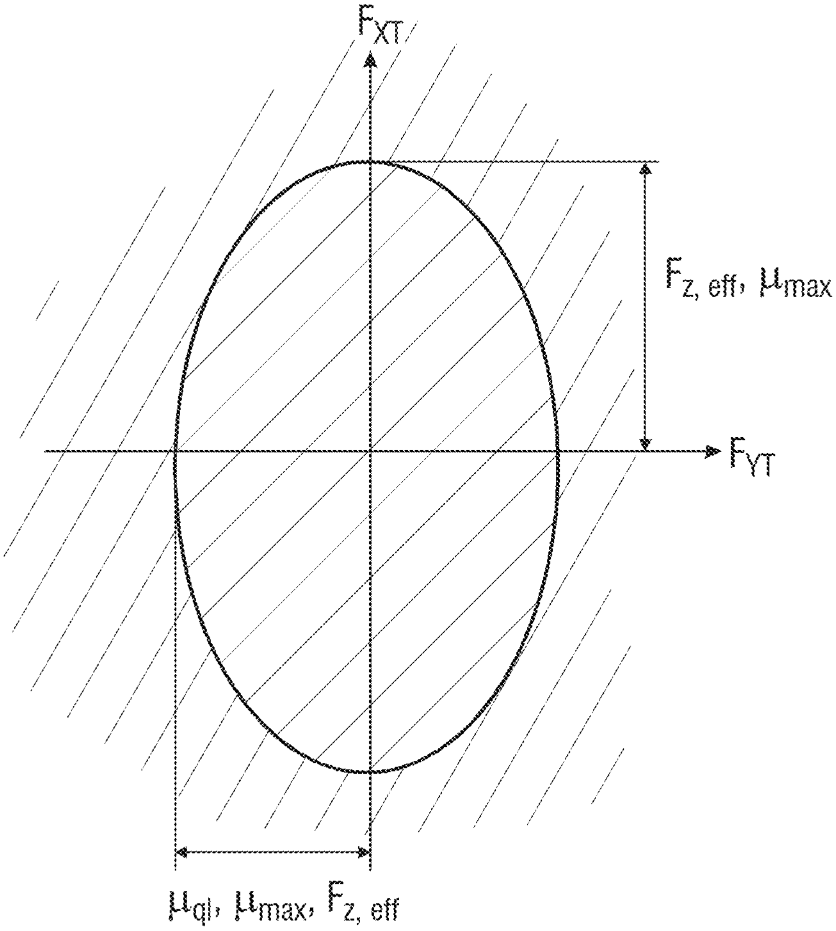
Figure 11:
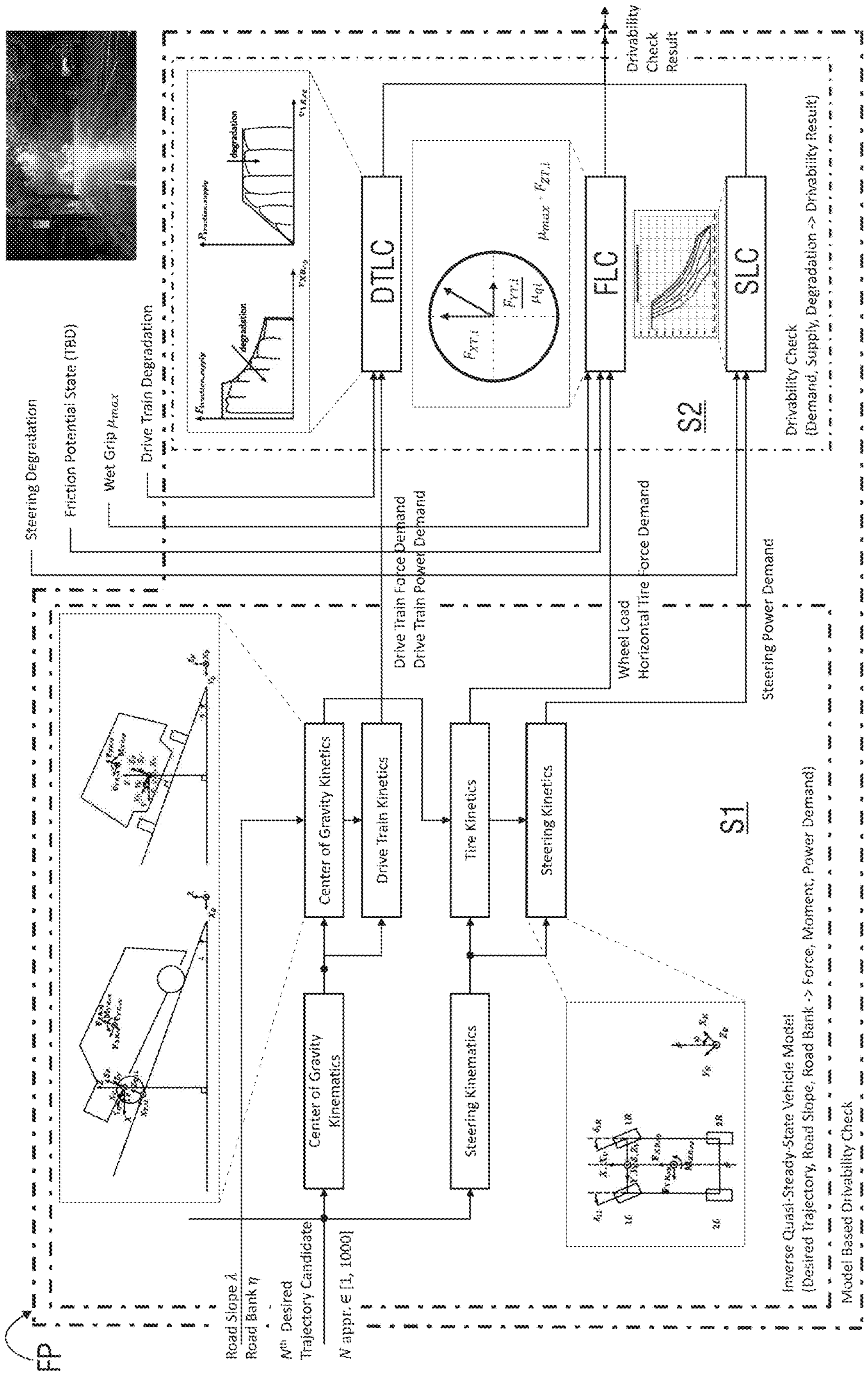

Here:

FIG. 1 shows a schematic side view of a vehicle with different axle systems, FIG. 2 shows a schematic rear view of a vehicle with different axle systems, FIG. 3 shows a schematic plan view of a vehicle with different axle systems, FIG. 4 shows schematic rotations of axle systems, FIG. 5 shows a schematic view of the vehicle, wherein the roll axis, the front roll center and the rear roll center are shown, FIG. 6 shows a schematic view of the vehicle, FIG. 7 shows a schematic view of the vehicle with front and rear axial forces and torques, FIG. 8 shows a schematic view of the front axle with tire forces, chassis reaction forces and the chassis reaction torque, FIG. 9 shows schematic views of look-up-tables, FIG. 10 shows a schematic view of a tire forces-ellipse, and FIG. 11 shows a schematic close-up view of a functional design of a device for model-based testing of drivability.

Parts that correspond to each other are labelled with the same reference numerals in all figures.

DETAILED DESCRIPTION

The present invention relates to the assessing of the drivability of all desired trajectories from a number of potential trajectories that are given in fixed coordinates as horizontal trajectories, wherein drivability limits for trajectories are typically given as vehicle and road surface parameters. Examples are the potential friction, which limits the maximum attainable horizontal tire forces, and the driving forces and power limits in the drive train, which limit possible acceleration. For testing these limits, it is necessary to calculate the associated vehicle parameters from the desired trajectories. Herein, a quasi-steady-state (QSS) modelling approach is selected, in order to calculate both tire forces and also the driving force and power limits from a given, desired trajectory. Herein, an amount of, for example, 1000 desired possible trajectories with a length of 10 s was used, which were evaluated every 100 ms. The running time is therefore an important point and the main reason for the choice of a quasi-steady-state modelling approach instead of, for example, a dynamic model, which requires more exact sampling and solving of the common differential equations of this model.

The axle systems used in the following obey ISO 8855:2011. The most important axle systems are indicated below. A graphic overview of relevant perpendicular axle systems, kinematic characteristics, forces and torques is shown in FIGS. 1, 2 and 3.

The vehicle axle system ($X_V$, $Y_V$, $Z_V$) is an axle system that is rooted in the reference frame of the sprung vehicle mass so that the $X_V$ axis is essentially aligned horizontally and to the front (if the vehicle 1 is at a standstill) and parallel to the longitudinal plane of symmetry of the vehicle 1. The $Y_V$ axis is perpendicular to the longitudinal plane of symmetry of the vehicle 1 and points to the left, wherein the $Z_V$ axis points upwards. The source of the associated vehicle coordinate system ($x_V$, $y_V$, $z_V$) is in the middle of the front axle during static reference load conditions.

The fixed axle system ($X_E$, $Y_E$, $Z_E$) is an axle system that is fixed in the context of the vehicle being stationary. $X_E$ and $Y_E$ are parallel to the plane of the ground. $Z_E$ points upwards and is aligned with the gravity vector. The source of the associated fixed coordinate system ($x_E$, $y_E$, $z_E$) is on the plane of the ground.

The interconnected, levelled axle system (X, Y, Z) is an axle system, the X and Y axes of which are parallel to the plane of the ground, wherein the X axis is aligned on the vertical projection of the $X_V$ axis, on the plane of the ground. The source of the associated coordinate system (x, y, z) coincides with the source of the vehicle coordinate system.

The road surface plane axle system ($X_R$, $Y_R$, $Z_R$) is an axle system, the $X_R$ and $Y_R$ axes of which are parallel to the plane of the road surface, wherein the $X_R$ axis is aligned on the vertical projection of the $X_V$ axis, on the road surface plane. The source of the associated road surface coordinate system ($x_R$, $y_R$, $z_R$) coincides with the source of the vehicle axle system. The road surface plane is a best-fit for the four contact points of the tires.

The tire axle system ($X_{T,1R}$, $Y_{T,1R}$, $Z_{T,1R}$) for the right front wheel 1R, the tire axle system ($X_{T,1L}$, $Y_{T,1L}$, $Z_{T,1L}$) for the left front wheel 1L, the tire axle system ($X_{T,2R}$, $Y_{T,2R}$, $Z_{T,2R}$) for the right year wheel 2R and the tire axle system ($X_{T,2L}$, $Y_{T,2L}$, $Z_{T,2L}$) for the left rear wheel 2L are axle systems, the $X_T$ and $Y_T$ axes of which are parallel to the plane of the road surface, wherein the $Z_T$ axis is aligned normal to the road surface plane, wherein the alignment of the $X_T$ axis is defined by the intersection of the wheel plane and the road surface plane, wherein the positive $Z_T$ axis points upwards. FIG. 1 further shows the angle of incline θ (negatively shown) and the road surface slope angle λ (negatively shown) according to ISO 8855:2011. $F_{X\,R,cg}$, $F_{Y\,R,cg}$ and $F_{Z\,R,cg}$ are arbitrary force vector components, which are aligned with the road surface axle system and operate at the center of gravity of the vehicle 1. $M_{X\,R,cg}$, $M_{Y\,R,cg}$ and $M_{Z\,R,cg}$ are arbitrary torque vector components, which are aligned with the road surface axle system.

FIG. 2 further shows a roll angle φ (positively shown, rotation around the $X_V$ axis), the vehicle roll angle $\varphi_V$ (positively shown, rotation around the X axis), and the road surface-level camber angle η (positively shown, rotation around the X axis), according to ISO 8855:2011.

FIG. 3 further shows the yaw angle ψ (positively shown, from the $X_E$ axis to the X axis, around $Z_E$) and the left and right front steering angle $\delta_{1L}$, $\delta_{1R}$ (positively shown, angle from the $X_V$ axis to the wheel plane, around the $Z_V$ axis), according to ISO 8855:2011.

Acceleration and speed of potential trajectories that are provided through the trajectory planning are given as projections of the desired movement of the rear axle in the interconnected X-Y plane. So that they can be used as input parameters of a model, these characteristics must be converted to accelerations and speeds describing the movement of the center of gravity in the road surface plane given by $X_R$-$Y_R$. The corresponding coordinate transformation between the coordinate systems (x, y, z) and ($x_R$, $y_R$, $z_R$) are derived in this phase.

FIG. 1 shows the corresponding rotations. It should be noted that the angles provided as input parameters are the road surface-level slope λ (gradients) and road surface-level camber angle η (transverse incline), which are not equal to the rotation angles that are needed for the axle rotations. The following features can be taken from FIG. 1:

$$\overline{OB}=1, \tag{1}$$

$$\overline{OC}=1, \tag{2}$$

$$\overline{AB}=\sin(\eta_{X\,R}), \tag{3}$$

$$\overline{DC}=\sin(\eta), \tag{4}$$

$$\overline{AC}=\overline{AB}=\sin(\eta_{X\,R}), \tag{5}$$

$$\overline{DC}\;\overline{AC}=\cos(\lambda), \tag{6}$$

$$\overline{OE}=\cos(\eta_{X\,R}), \tag{7}$$

$$\overline{EF}=\sin(\eta_{X\,R}), \tag{8}$$

$$\overline{IF}=\overline{OE}=\cos(\eta_{X\,R}), \tag{9}$$

$$\overline{IG}=\overline{IF}=\cos(\eta_{X\,R}). \tag{10}$$

From this follows:

$$\cos(\lambda)=\frac{\overline{DC}}{\overline{AC}}=\frac{\sin(\eta)}{\sin(\eta_{XR})}, \tag{11}$$

$$\sin(\eta_{XR})=\frac{\sin(\eta)}{\cos(\lambda)}, \tag{12}$$

$$\sin(\eta)=\sin(\eta_{XR})\cdot\cos(\lambda), \tag{13}$$

FIG. 4 shows the rotations of the axles that put the road surface-level slope angle λ and the road surface-level camber angle q in relation:

1. The rotation of the interconnected, levelled axle system (X, Y, Z) at the angle ηX R around X leads to an auxiliary axle system (X', Y', Z').
2. The rotation of the auxiliary axle system (X', Y', Z') around Y (!) around the angle λ results in the road surface axle system ($X_R$, $Y_R$, $Z_R$). It was noticed that the rotation occurs around the original Y axis, not around Y', which is different to the usual Euler angle or Tait-Bryan angle rotations, which cause rotations around the resulting axle systems. A and n are the angles between $X_R$, $Y_R$ and their respective projections in the horizontal plane. These projections do not form a perpendicular pair of vectors.

In order to define coordinate transformations (or passive transformations, as in M. J. Benacquista, J. D. Romano, *Classical Mechanics*, Springer, Cham, C H, 2018, pp. 193) between (x, y, z) and ($x_R$, $y_R$, $z_R$), it is possible to differentiate between intrinsic and extrinsic rotation matrices (see M. J. Benacquista, J. D. Romano, *Classical Mechanics*, Springer, Cham, C H, 2018, pp. 200), which are defined either with axes relative to the rotated body (intrinsically) or with axes that are fixed in space (extrinsically). The rotations in FIG. 4 are given as a sequence of extrinsic rotations:

1. Rotation around X, around the angle $\eta_X$ R.
2. Rotation around Y, around the angle λ.

Applying M. J. Benacquista, J. D. Romano, *Classical Mechanics*, Springer, Cham, C H, 2018, this is equivalent to the intrinsic rotations:

1. Rotation around Y, around the angle λ,
2. Rotation around $X_0$ (!), around the angle $\eta_X$ R.

Therefore, the coordinate transformation $T_{IR}$ from (x, y, z) to ($x_R$, $y_R$, $z_R$) can be given using two rotation matrices for intrinsic rotations, for example:

$$\begin{bmatrix} x_R \\ y_R \\ z_R \end{bmatrix} = \underbrace{\underbrace{\begin{bmatrix} 1 & 0 & 0 \\ 0 & \cos(\eta_{XR}) & \sin(\eta_{XR}) \\ 0 & -\sin(\eta_{XR}) & \cos(\eta_{XR}) \end{bmatrix}}_{T_{X'}(\eta_{XR})} \underbrace{\begin{bmatrix} \cos(\lambda) & 0 & -\sin(\lambda) \\ 0 & 1 & 0 \\ \sin(\lambda) & 0 & \cos(\lambda) \end{bmatrix}}_{T_Y(\lambda)}}_{T_{IR}} \begin{bmatrix} x \\ y \\ z \end{bmatrix} \tag{14}$$

By combining both transformation matrices, $T_{IR}$ is given by:

$$T_{IR}=\begin{bmatrix} \cos(\lambda) & 0 & -\sin(\lambda) \\ \sin(\eta_{XR})\sin(\lambda) & \cos(\eta_{XR}) & \sin(\eta_{XR})\cos(\lambda) \\ \cos(\eta_{XR})\sin(\lambda) & -\sin(\eta_{XR}) & \cos(\eta_{XR})\cos(\lambda) \end{bmatrix} \tag{15}$$

Replacing $\eta_{X\,R}$ with equation (12) gives:

$$T_{IR}=\begin{bmatrix} \cos(\lambda) & 0 & -\sin(\lambda) \\ \frac{\sin(\eta)}{\cos(\lambda)}\sin(\lambda) & \cos\left(\arcsin\left(\frac{\sin(\eta)}{\cos(\lambda)}\right)\right) & \sin(\eta) \\ \cos\left(\arcsin\left(\frac{\sin(\eta)}{\cos(\lambda)}\right)\right)\sin(\lambda) & -\frac{\sin(\eta)}{\cos(\lambda)} & \cos\left(\arcsin\left(\frac{\sin(\eta)}{\cos(\lambda)}\right)\right)\cos(\lambda) \end{bmatrix} \tag{16}$$

The coordinate transformation $T_{ER}$ of fixed coordinates $(x_E, y_E, z_E)$ to road surface-level coordinates $(x_R, y_R, z_R)$ can be found by extending equation (14):

$$\begin{bmatrix} x_R \\ y_R \\ z_R \end{bmatrix} = \underbrace{\begin{bmatrix} 1 & 0 & 0 \\ 0 & \cos(\eta_{XR}) & \sin(\eta_{XR}) \\ 0 & -\sin(\eta_{XR}) & \cos(\eta_{XR}) \end{bmatrix}}_{T_{X'(\eta_{XR})}} \underbrace{\begin{bmatrix} \cos(\lambda) & 0 & -\sin(\lambda) \\ 0 & 1 & 0 \\ \sin(\lambda) & 0 & \cos(\lambda) \end{bmatrix}}_{T_Y(\lambda)} \underbrace{\begin{bmatrix} \cos(\psi) & \sin(\psi) & 0 \\ -\sin(\psi) & \cos(\psi) & 0 \\ 0 & 0 & 1 \end{bmatrix}}_{T_{z_E}(\psi)} \begin{bmatrix} x_E \\ y_E \\ z_E \end{bmatrix} \quad (17)$$

$$\underbrace{\phantom{XXXXXXXXXXXXXXXXXXXXXXXXXXXXXXXXXXXXXXXXXXXXXXXXXXXXXX}}_{T_{ER}}$$

$T_{ZE}$ thereby refers to the matrix in right rotation around $Z_E$, around the angle $\psi$ (see FIG. 3) connected with a coordinate transformation of fixed coordinates $(x_E, y_E, z_E)$ to intermediate coordinates $(x, y, z)$, as can be found in D. T. Greenwood, *Principles of Dynamics*, Prentice Hall, Upper Saddle River, US-NJ, 2nd edition, 1988, pp. 357. With the combination of all transformation matrices, $T_{ER}$ is given by:

$$T_{ER} = \begin{bmatrix} \cos(\psi)\cos(\lambda) & \sin(\psi)\cos(\lambda) & -\sin(\lambda) \\ -\sin(\psi)\cos(\eta_{XR}) + \cos(\psi)\sin(\lambda)\sin(\eta_{XR}) & \cos(\psi)\cos(\eta_{XR}) + \sin(\psi)\sin(\lambda)\sin(\eta_{XR}) & \cos(\lambda)\sin(\eta_{XR}) \\ \sin(\psi)\sin(\eta_{XR}) & -\cos(\psi)\sin(\eta_{XR}) + \sin(\psi)\sin(\lambda)\cos(\eta_{XR}) & \cos(\lambda)\cos(\eta_{XR}) \end{bmatrix} \quad (18)$$

The matrix in equation (18) contains a line break to improve readability, wherein the first column before the line break and the second and third column after the line break are shown.

For the quasi-steady-state descriptions of the vehicle, a double track model in motion is assumed as as an assumed model.

The following aspects are taken into consideration:
lateral acceleration in curves
longitudinal acceleration as a result of driving and braking
aerodynamic drag
aerodynamic lift
roll torque distribution between front axle and rear axle
stationary influence of transverse incline and gradient
roll resistance (only the influence of the necessary motor torque)

The following aspects are disregarded:
roll and pitching movement of the suspension
fast changes of transverse incline and gradient
differences between overall mass and sprung mass
asymmetric lateral load conditions
influence of ABS, ASR and ESP (i.e., the model is a slightly conservative description of the vehicle capabilities)
differences in left and right driving and braking forces (i.e. no torque vectoring and no μ-split)
long cornering and parking maneuvers FIG. 5 is a schematic view of the vehicle 1 in the $X_R$-$Z_R$ plane, wherein the roll axis RA, the front roll center FRC and the rear roll center RRC are illustrated. $h_{cg}$ refers to the height of the center of gravity, $l_f$ the space between the center of gravity and the front axle and I the wheelbase. $F_{X\,R,f}$, $F_{Z\,R,f}$, $F_{X\,R,r}$, $F_{Z\,R,r}$ are axle forces and $F_{X\,R,R1}$, $F_{Z\,R,R1}$, $F_{X\,R,L1}$, $F_{Z\,R,L1}$, $F_{X\,R,R2}$, $F_{Z\,R,R2}$, $F_{X\,R,L2}$, $F_{Z\,R,L2}$ are tire forces. $F_{X\,R,cg}$ and $F_{Z\,R,cg}$ are arbitrary force vector components that are aligned with the road surface plane axle system at the center of gravity of the vehicle 1. $M_{Y\,R,cg}$ is an arbitrary torque vector component that is aligned with the road surface plane axle system.

It is apparent from FIG. 5 that the balance of forces in the ZR direction result as follows:

$$F_{Z\,R,f} + F_{Z\,R,r} + F_{Z\,R,cg} = 0. \quad (19)$$

The balance of the torques around $Y_R$ on the front axle at ground level is:

$$F_{Z\,R,r} \cdot l + F_{Z\,R,cg} \cdot l_f + F_{X\,R,cg} \cdot h_{cg} + M_{Y\,R,cg} = 0. \quad (20)$$

From (20) follows:

$$F_{ZR,r} = -\frac{l_f}{l} F_{ZR,cg} - \frac{h_{cg}}{l} F_{XR,cg} - \frac{1}{l} M_{YR,cg} \quad (21)$$

and application in equation (19) leads to:

$$F_{ZR,f} = -\underbrace{\left(1 - \frac{l_f}{l}\right)}_{=\frac{l_h}{l}} F_{ZR,cg} + \frac{h_{cg}}{l} F_{XR,cg} + \frac{1}{l} M_{YR,cg}. \quad (22)$$

The plausibility can easily be considered by applying, for example, $F_{Z\,R,cg} = -m \cdot g$ and $F_{X\,R,cg} = -m \cdot a_{X\,R}$.

Note: Wheel load transfer during acceleration and braking is assumed in a uniformly distributed manner on the left and right wheel due to symmetry. Therefore, in (21) and (22), no pitching center or pitching torque distribution must be taken into consideration. However, the roll torque distribution is taken into consideration in the following phases.

FIG. 6 shows a schematic view of the vehicle 1 in the $X_R$-$Y_R$ plane. $F_{X\,R,f}$, $F_{Y\,R,f}$, $F_{X\,R,r}$, $F_{Y\,R,r}$ are axle forces. $F_{X\,R,cg}$, $F_{Y\,R,cg}$ and $F_{Z\,R,cg}$ are arbitrary force vector components, which are aligned with the road surface plane axle system and operate at the center of gravity of the vehicle 1. $M_{X\,R,cg}$, $M_{Y\,R,cg}$ and $M_{Z\,R,cg}$ are arbitrary torque vector components, which are aligned with the road surface plane axle system.

It is apparent from FIG. 6 that the balance of forces in the YR direction result as follows:

$$F_{Y\,R,f} + F_{Y\,R,r} + F_{Y\,R,cg} = 0. \quad (23)$$

The balance of the torques around $Z_R$ on the front axle center is:

$$-F_{Y\,R,cg} \cdot l_f - F_{Y\,R,r} \cdot l + M_{Z\,R,cg} = 0. \quad (24)$$

Left and right braking and driving forces are assumed equally and therefore do not contribute to the balance of the torques around $Z_R$. It therefore follows from (24) that $$F_{YR,r} = -\frac{l_f}{l} F_{YR,cg} + \frac{1}{l} M_{ZR,cg} \quad (23)$$

and applying this equation in (25) leads to $$F_{YR,f} = -\underbrace{\left(1 - \frac{l_f}{l}\right)}_{=\frac{l_h}{l}} F_{YR,cg} - \frac{1}{l} M_{ZR,cg}. \quad (26)$$

In the $X_R$ direction, this applies:

$$F_{X\,R,f} + F_{X\,R,r} + F_{X\,R,cg} = 0. \quad (27)$$

$F_{X\,R,r}$ and $F_{X\,R,f}$ are determined by driving and braking torque distribution.

FIG. 7 is a schematic view of the vehicle 1 in the $Y_R$-$Z_R$ plane with the front and rear axle forces $F_{Y\,R,f}$, $F_{Y\,R,r}$ and torques $M_{X\,R,f}$, $M_{X\,R,r}$. $F_{Y\,R,cg}$, and $F_{Z\,R,cg}$ are arbitrary force vector components, which are aligned with the road surface plane axle system and operate at the center of gravity of the vehicle 1. $M_{X\,R,cg}$ is an arbitrary torque vector component, which is aligned with the road surface plane axle system. $h_{cg}$ refers to the height of the center of gravity and $h_{rcg}$ is the height of the roll center $RC_{cg}$ at the $x_R$ position of the center of gravity.

The balance of the torques around the $X_R$ axis can be taken from FIG. 7, which illustrates the front and rear axle forces $F_{Y\,R,f}$, $F_{Y\,R,r}$ and torques $M_{X\,R,f}$, $M_{X\,R,r}$ as well as arbitrary forces and torques that operate at the center of gravity. If the roll center $RC_{cg}$ is used at the $x_R$ position of the center of gravity in order to convey the balance of the torques around $x_R$, then it follows that:

$$M_{XR,cg} + \underbrace{M_{XR,f} + M_{XR,r}}_{:=M_{XR,f+r}} - (h_{cg} - h_{rcg}) \cdot F_{YR,cg} = 0. \quad (28)$$

With the introduction of $M_{X\,R,f+r}$, this can be transposed as:

$$M_{X\,R,f+r} = (h_{cg} - h_{rcg}) \cdot F_{Y\,R,cg} - M_{X\,R,cg}. \quad (29)$$

FIG. 8 is a schematic view of the front axle in the $Y_R$-$Z_R$ plane with the tire forces. $F_{Y\,R,1L}$, $F_{Z\,R,1L}$, $F_{Y\,R,1R}$, $F_{Z\,R,1R}$, chassis reaction forces $F_{Y\,R,1}$, $F_{Z\,R,1}$ and the chassis reaction torque $M_{X\,R,1}$. $h_{rf}$ refers to the height of the roll center of the front axle FRC and $b_f$ is the track width of the front axle. It should be noted that the tire forces $F_{Y\,R,1L}$ and $F_{Y\,R,1R}$ are still given as vector components in road surface plane coordinates, which do not correspond to $F_{Y\,T,1L}$ and $F_{Y\,T,1R}$ in tire coordinates.

If a roll torque distribution is introduced that combines the influence of the stiffness of the suspension and of the stabilizer, it is possible to maintain the roll torques of the front and rear axles that are caused due to the displacement between the center of gravity and the roll axis:

$$M_{XR,f} = \kappa \cdot M_{XR,f+r} = \kappa((h_{cg} - h_{rcg}) \cdot F_{YR,cg} - M_{XR,cg}), \quad (30)$$

$$M_{XR,r} = (1-\kappa) \cdot M_{XR,f+r} = (1-\kappa)((h_{cg} - h_{rcg}) \cdot F_{YR,cg} - M_{XR,cg}) \quad (31)$$

Since the roll torque distribution and the axle forces are provided, it is possible to calculate the vertical tire forces as illustrated in FIG. 8.

The balance of forces in the $Z_R$ and $Y_R$ directions results in:

$$F_{Z\,R,1L} + F_{Z\,R,1R} + F_{Z\,R,1} = 0, \quad (32)$$

$$F_{Y\,R,1L} + F_{Y\,R,1R} + F_{Y\,R,1} = 0, \quad (33)$$

$$F_{Z\,R,2L} + F_{Z\,R,2R} + F_{Z\,R,2} = 0, \quad (34)$$

$$F_{Y\,R,2L} + F_{Y\,R,2R} + F_{Y\,R,2} = 0. \quad (35)$$

The balance of torques around the axis of symmetry at the road surface plane level results in:

$$\frac{b_f}{2} F_{ZR,1L} - \frac{b_f}{2} F_{ZR,1R} - h_{rf} \cdot F_{YR,1} + M_{XR,1} = 0, \quad (36)$$

$$\frac{b_r}{2} F_{ZR,2L} - \frac{b_r}{2} F_{ZR,2R} - h_{rr} \cdot F_{YR,2} + M_{XR,2} = 0. \quad (37)$$

With Newton's third law, the chassis reaction forces and the axle forces are put in relation as follows:

$$F_{Y\,R,1} = -F_{Y\,R,f}, \quad (38)$$

$$F_{Z\,R,1} = -F_{Z\,R,f}, \quad (39)$$

$$M_{X\,R,1} = -M_{X\,R,f}. \quad (40)$$

The application of this and (32) to (37) leads to:

$$F_{ZR,1L} + F_{ZR,1R} - F_{ZR,f} = 0, \quad (41)$$

$$F_{YR,1L} + F_{YR,1R} - F_{YR,f} = 0, \quad (42)$$

$$F_{ZR,2L} + F_{ZR,2R} - F_{ZR,r} = 0, \quad (43)$$

$$F_{YR,2L} + F_{YR,2R} - F_{YR,r} = 0, \quad (44)$$

$$\underbrace{\frac{b_f}{2} F_{ZR,1L} - F_{ZR,1R}}_{:=2\cdot\Delta F_{ZR,1}} + h_{rf} \cdot F_{YR,f} - M_{XR,f} = 0, \quad (45)$$

$$\underbrace{\frac{b_f}{2} F_{ZR,2L} - F_{ZR,2R}}_{:=2\cdot\Delta F_{ZR,2}} + h_{rr} \cdot F_{YR,r} - M_{XR,r} = 0. \quad (46)$$

The solution of (41) and (43) as well as for $F_{Z\,R,1L}$, $F_{Z\,R,1R}$ and also for $F_{Z\,R,2L}$, $F_{Z\,R,2R}$ and the subsequent application of the results in (45) and (46) results in:

$$\frac{b_f}{2}(F_{ZR,1L} - F_{ZR,f} + F_{ZR,1L}) + h_{rf} \cdot F_{YR,f} - M_{XR,f} = 0, \quad (47)$$

$$b_f \cdot F_{ZR,1L} - \frac{b_f}{2} F_{ZR,f} + h_{rf} \cdot F_{YR,f} - M_{XR,f} = 0, \quad (48)$$

$$F_{ZR,1L} = \frac{1}{2} F_{ZR,f} - \frac{h_{rf}}{b_f} F_{YR,f} + \frac{1}{b_f} M_{XR,f} \quad (49)$$

$$\frac{b_f}{2}(F_{ZR,f} - F_{ZR,1R} - F_{ZR,1R}) + h_{rf} \cdot F_{YR,f} - M_{XR,f} = 0, \quad (50)$$

$$\frac{b_f}{2} F_{ZR,f} - b_f \cdot F_{ZR,1R} + h_{rf} \cdot F_{YR,f} - M_{XR,f} = 0, \quad (51)$$

$$F_{ZR,1R} = \frac{1}{2} F_{ZR,f} + \frac{h_{rf}}{b_f} F_{YR,f} - \frac{1}{b_f} M_{XR,f} \quad (52)$$

$$\frac{b_r}{2}(F_{ZR,2L} - F_{ZR,r} + F_{ZR,2L}) + h_{rr} \cdot F_{YR,r} - M_{XR,r} = 0, \quad (53)$$

$$b_r \cdot F_{ZR,2L} - \frac{b_r}{2} F_{ZR,r} + h_{rr} \cdot F_{YR,r} - M_{XR,r} = 0, \quad (54)$$

$$F_{ZR,2L} = \frac{1}{2} F_{ZR,r} - \frac{h_{rr}}{b_r} F_{YR,r} + \frac{1}{b_r} M_{XR,r} \quad (55)$$

-continued $$\frac{b_r}{2}(F_{ZR,r} - F_{ZR,2R} - F_{ZR,2R}) + h_{rr} \cdot F_{YR,r} - M_{XR,r} = 0, \tag{56}$$

$$\frac{b_r}{2}F_{ZR,r} - b_r \cdot F_{ZR,2R} + h_{rr} \cdot F_{YR,r} - M_{XR,r} = 0, \tag{57}$$

$$F_{ZR,2R} = \frac{1}{2}F_{ZR,r} + \frac{h_{rr}}{b_r}F_{YR,r} - \frac{1}{b_r}M_{XR,r} \tag{58}$$

Application of (22), (26) and (30) in (49) and (52) results in:

$$F_{ZR,1L} = \frac{1}{2}\left(-\left(1 - \frac{l_f}{l}\right)F_{ZR,cg} + \frac{h_{cg}}{l}F_{XR,cg} + \frac{1}{l}M_{YR,cg}\right) - \frac{h_{rf}}{b_f}\left(-\left(1 - \frac{l_f}{l}\right)F_{YR,cg} - \frac{1}{l}M_{ZR,cg}\right) + \frac{1}{b_f} \cdot \kappa((h_{cg} - h_{rcg})F_{YR,cg} - M_{XR,cg}), \tag{59}$$

$$\underbrace{F_{ZR,1L}}_{\geq 0(constraint)} = \frac{1}{2}\frac{h_{cg}}{l}F_{XR,cg} - \frac{1}{b_f} \cdot \kappa \cdot M_{XR,cg} + \left(\frac{h_{rf}}{b_f}\left(1 - \frac{l_f}{l}\right) + \kappa\frac{h_{cg} - h_{rcg}}{b_f}\right)F_{YR,cg} + \frac{1}{2 \cdot l}M_{YR,cg} - \frac{1}{2}\left(1 - \frac{l_f}{l}\right)F_{ZR,cg} + \frac{h_{rf}}{b_f \cdot l}M_{ZR,cg}, \tag{60}$$

$$F_{ZR,1R} = \frac{1}{2}\left(-\left(1 - \frac{l_f}{l}\right)F_{ZR,cg} + \frac{h_{cg}}{l}F_{XR,cg} + \frac{1}{l}M_{YR,cg}\right) + \frac{h_{rf}}{b_f}\left(-\left(1 - \frac{l_f}{l}\right)F_{YR,cg} - \frac{1}{l}M_{ZR,cg}\right) - \frac{1}{b_f} \cdot \kappa((h_{cg} - h_{rcg})F_{YR,cg} - M_{XR,cg}), \tag{61}$$

$$\underbrace{F_{ZR,1R}}_{\geq 0(constraint)} = \frac{1}{2}\frac{h_{cg}}{l}F_{XR,cg} + \frac{1}{b_f} \cdot \kappa \cdot M_{XR,cg} - \left(\frac{h_{rf}}{b_f}\left(1 - \frac{l_f}{l}\right) + \kappa\frac{h_{cg} - h_{rcg}}{b_f}\right)F_{YR,cg} + \frac{1}{2 \cdot l}M_{YR,cg} - \frac{1}{2}\left(1 - \frac{l_f}{l}\right)F_{ZR,cg} - \frac{h_{rf}}{b_f \cdot l}M_{ZR,cg}. \tag{62}$$

Application of (21), (25) and (31) in (55) and (58) results in:

$$F_{ZR,2L} = \frac{1}{2}\left(-\frac{l_f}{l}F_{ZR,cg} - \frac{h_{cg}}{l}F_{XR,cg} - \frac{1}{l}M_{YR,cg}\right) - \frac{h_{rr}}{b_r}\left(-\frac{l_f}{l}F_{YR,cg} + \frac{1}{l}M_{ZR,cg}\right) + \frac{1}{b_r} \cdot (1 - \kappa)((h_{cg} - h_{rcg})F_{YR,cg} - M_{XR,cg}), \tag{63}$$

$$\underbrace{F_{ZR,2L}}_{\geq 0(constraint)} = -\frac{1}{2}\frac{h_{cg}}{l}F_{XR,cg} - \frac{1}{b_r} \cdot (1 - \kappa) \cdot M_{XR,cg} + \left(\frac{h_{rr}}{b_r}\frac{l_f}{l} + (1 - \kappa)\frac{h_{cg} - h_{rcg}}{b_r}\right)F_{YR,cg} - \frac{1}{2 \cdot l}M_{YR,cg} - \frac{1}{2}\frac{l_f}{l}F_{ZR,cg} + \frac{h_{rr}}{b_r \cdot l}M_{ZR,cg}, \tag{64}$$

$$F_{ZR,2R} = \frac{1}{2}\left(-\frac{l_f}{l}F_{ZR,cg} - \frac{h_{cg}}{l}F_{XR,cg} - \frac{1}{l}M_{YR,cg}\right) + \frac{h_{rr}}{b_r}\left(-\frac{l_f}{l}F_{YR,cg} + \frac{1}{l}M_{ZR,cg}\right) - \frac{1}{b_r} \cdot (1 - \kappa)((h_{cg} - h_{rcg})F_{YR,cg} - M_{XR,cg}), \tag{65}$$

$$\underbrace{F_{ZR,2R}}_{\geq 0(constraint)} = -\frac{1}{2}\frac{h_{cg}}{l}F_{XR,cg} + \frac{1}{b_r} \cdot (1 - \kappa) \cdot M_{XR,cg} - \left(\frac{h_{rr}}{b_r}\frac{l_f}{l} + (1 - \kappa)\frac{h_{cg} - h_{rcg}}{b_r}\right)F_{YR,cg} - \tag{66}$$

-continued $$\frac{1}{2 \cdot l}M_{YR,cg} - \frac{1}{2}\frac{l_f}{l}F_{ZR,cg} + \frac{h_{rr}}{b_r \cdot l}M_{ZR,cg}.$$

$F_{Z\ R,1L}$, $F_{Z\ R,1R}$, $F_{Z\ R,2L}$, $F_{Z\ R,2R}$ in the above equations must be limited to values>=0, since negative forces are not possible as a result of the elevation of the wheel.

In order to calculate the lateral tire force distribution and the maximum horizontal tire forces, the concept of the effective wheel loads is introduced. Maximum horizontal tire forces do not increase linearly with the wheel load, but rather show a slightly degressive behavior. This means that two uniformly loaded wheels together apply a higher maximum horizontal tire force than two non-uniformly loaded wheels, even if they have the same total vertical forces. There are different approaches to model this behavior. Here, an approach is used according to R. Orend, *Modelling and Control of a vehicle with single-wheel chassis actuators*, IFAC Proceedings Volume 38, Issue 1, Pages 79-84, 2005, that introduces the effective wheel loads $F_{ZT,eff,i}$ as follows:

$$F_{ZT,eff,i} = F_{ZT,i}\left(1 + k_{FZ}\frac{F_{ZT,N,i} - F_{ZT,i}}{F_{ZT,N,i}}\right),\quad i \in \{1L, 1R, 2L, 2R\}, \tag{67}$$

wherein $0 \leq k_{FZ} \leq 1$ refers to an empirical wheel load degression factor and $F_{ZT,N,i}$ refers to the nominal wheel load.

If only longitudinal or only lateral tire forces are assumed, the respective peak forces can be modelled as follows:

$$F_{XT,max,i} = \mu_{max} \cdot F_{ZT,eff,i}, \tag{68}$$

$$F_{YT,max,i} = \mu_{max} \cdot \mu_{ql} \cdot F_{ZT,eff,i}, i \in \{1L, 1R, 2L, 2R\}, \tag{69}$$

wherein $\mu_{max}$ is the potential friction value and $\mu_{ql}$ refers to the ratio of the lateral traction to the longitudinal traction, which anisotropically models tire force characteristics.

In order to calculate the horizontal tire forces in the $X_R$ direction, the definitions $$F_{X\ R,r+f} := F_{X\ R,r} + F_{X\ R,f} \tag{70}$$

and (27) are used, in order to form the following:

$$F_{X\ R,r+f} := F_{X\ R,r} + F_{X\ R,f} = -F_{X\ R,cg}. \tag{71}$$

If the driving and braking torque distributions $\gamma_d$ and $\gamma_b$ are introduced, which are collectively referred to as $\gamma_{djb}$, then the front axle and rear axle forces in the $X_R$ direction are given as follows:

$$F_{XR,f} = \gamma_{djb} \cdot F_{XR,r+f} = -\gamma_{djb} \cdot F_{XR,cg}, \tag{72}$$

$$F_{XR,r} = (1 - \gamma_{djb}) \cdot F_{XR,r+f} = -(1 - \gamma_{djb}) \cdot F_{XR,cg}. \tag{73}$$

Assuming the same left and right driving and braking forces, as mentioned above, this leads to:

$$F_{XR,1L} = F_{XR,1R} = -\frac{\gamma_{d|b}}{2} \cdot F_{XR,cg}, \tag{74}$$

$$F_{XR,2L} = F_{XR,2R} = -\frac{(1 - \gamma_{d|b})}{2} \cdot F_{XR,cg}. \tag{75}$$

In order to calculate the tire forces in the $Y_R$ direction, the following function is used, as described in D. Ammon, *Modellbildung und Systementwicklung in der Fahrzeugdynamik* [Modelling and system development in vehicle dynamics], Teubner, Stuttgart, DE, 1997:

$$F_{YT,i} = \frac{\alpha_i}{\sqrt{\alpha_i^2 + s_i^2}} \underbrace{\mu_{Y,max}}_{=\mu_{max}\cdot\mu_{ql}} \cdot F_{ZT,eff,i} \cdot \underbrace{g\left(\frac{\sqrt{\alpha_i^2+s_i^2}}{\alpha_{max,N}\cdot\mu_{Y,max}}\right)}_{\text{normalized shape function with value sin}[0,1]}, \; i \in \{1L, 1R, 2L, 2R\}. \tag{76}$$

$\alpha_i$ refers to the side-slip angle and si to the longitudinal slip as defined in D. Ammon, *Modellbildung und Systementwicklung in der Fahrzeugdynamik*, Teubner, Stuttgart, DE, 1997. The normalized shape function is saturated for the larger side-slip angle at 1, which is the only interesting area for further consideration. $\alpha_{max,N}$ is a scaling factor without further meaning in the present study.

Assuming lateral tire forces $F_{Y\,T,i}$ with $i\epsilon\{1L,1R,2L,2R\}$ near the limits and therefore in the saturation range of $F_{Y\,T,I}$, the following assumptions can be made:

$$\alpha_{1R}\approx\alpha_{1L},\alpha_{2R}\approx\alpha_{2L},s_{1R}\approx s_{1L},s_{2R}\approx s_{2L}, \tag{77}$$

Using these assumptions and (76), the ratio of left and right tire forces per axle can be estimated as follows:

$$\frac{F_{YR,1L}}{F_{YR,1R}} \approx \frac{F_{YT,1L}}{F_{YT,1R}} \approx \frac{F_{ZT,eff,1L}}{F_{ZT,eff,1R}}, \tag{78}$$

$$\frac{F_{YR,2L}}{F_{YR,2R}} \approx \frac{F_{YT,2L}}{F_{YT,2R}} \approx \frac{F_{ZT,eff,2L}}{F_{ZT,eff,2R}}. \tag{79}$$

This means that the lateral tire force is distributed based on the effective wheel load ratio.

If tire and axle forces are put in relation in the $Y_R$ direction, then this results in:

$$F_{Y\,R,f}=F_{Y\,R,1L}+F_{Y\,R,1R}, \tag{80}$$

$$F_{Y\,R,f}=F_{Y\,R,2L}+F_{Y\,R,2R}. \tag{81}$$

By using (78) and (79), this can be transposed as follows:

$$F_{YR,f} = F_{YR,1R}\left(\frac{F_{ZT,eff,1L}}{F_{ZT,eff,1R}} + 1\right), \tag{82}$$

$$F_{YR,f} = F_{YR,1L}\left(1 + \frac{F_{ZT,eff,1R}}{F_{ZT,eff,1L}}\right), \tag{83}$$

$$F_{YR,r} = F_{YR,2R}\left(\frac{F_{ZT,eff,2L}}{F_{ZT,eff,2R}} + 1\right), \tag{84}$$

$$F_{YR,r} = F_{YR,2L}\left(1 + \frac{F_{ZT,eff,2R}}{F_{ZT,eff,2L}}\right). \tag{85}$$

Solving according to the tire forces results in:

$$F_{YR,1R} = \frac{F_{ZT,eff,1R}}{F_{ZT,eff,1L} + F_{ZT,eff,1R}} F_{YR,f}, \tag{86}$$

$$F_{YR,1L} = \frac{F_{ZT,eff,1L}}{F_{ZT,eff,1L} + F_{ZT,eff,1R}} F_{YR,f}, \tag{87}$$

-continued $$F_{YR,2R} = \frac{F_{ZT,eff,2R}}{F_{ZT,eff,2L} + F_{ZT,eff,2R}} F_{YR,r}, \tag{88}$$

$$F_{YR,2L} = \frac{F_{ZT,eff,2L}}{F_{ZT,eff,2L} + F_{ZT,eff,2R}} F_{YR,r}. \tag{89}$$

Introducing (25) and (26) results in the tire forces in the $Y_R$ direction:

$$F_{YR,1R} = \frac{F_{ZT,eff,1R}}{F_{ZT,eff,1L} + F_{ZT,eff,1R}}\left(-\underbrace{\left(1-\frac{l_f}{l}\right)}_{=\frac{l_h}{l}}F_{YR,cg} - \frac{1}{l}M_{ZR,cg}\right), \tag{90}$$

$$F_{YR,1L} = \frac{F_{ZT,eff,1L}}{F_{ZT,eff,1L} + F_{ZT,eff,1R}}\left(-\underbrace{\left(1-\frac{l_f}{l}\right)}_{=\frac{l_h}{l}}F_{YR,cg} - \frac{1}{l}M_{ZR,cg}\right), \tag{91}$$

$$F_{YR,2R} = \frac{F_{ZT,eff,2R}}{F_{ZT,eff,2L} + F_{ZT,eff,2R}}\left(-\frac{l_f}{l}F_{YR,cg} + \frac{1}{l}M_{ZR,cg}\right), \tag{92}$$

$$F_{YR,2L} = \frac{F_{ZT,eff,2L}}{F_{ZT,eff,2L} + F_{ZT,eff,2R}}\left(-\frac{l_f}{l}F_{YR,cg} + \frac{1}{l}M_{ZR,cg}\right). \tag{93}$$

Finally, the tire forces in the tire directions $X_T$, $Y_T$ and $Z_T$ are given by:

$$\begin{bmatrix} F_{XT,i} \\ F_{YT,i} \\ F_{ZT,i} \end{bmatrix} = \underbrace{\begin{bmatrix} \cos(\delta_i) & \sin(\delta_i) & 0 \\ -\sin(\delta_i) & \cos(\delta_i) & 0 \\ 0 & 0 & 1 \end{bmatrix}}_{T_{RT,i}} \begin{bmatrix} F_{XR,i} \\ F_{YR,i} \\ F_{ZR,i} \end{bmatrix}, \; i \in \{1L, 1R, 2L, 2R\}. \tag{94}$$

It is hereby possible to check whether the tire forces are within the friction limit:

$$F_{XT,i}^2 + \frac{F_{YT,i}^2}{\mu_{ql}^2} \le \mu_{max}^2 F_{ZT,eff,i}^2, \; i \in \{1L, 1R, 2L, 2R\}. \tag{95}$$

FIG. 10 shows a schematic view of a so-called tire force ellipse, in which the grip limit for combined forces $F_{XT}$ and $F_{YT}$ is illustrated.

The horizontal target tire forces should be within the friction value limits (maximum available potential traction, traction ellipse, see also DE 100 50 421 A1) determined by the friction value $\mu_{max}$ on every wheel.

If the inequation (95) is fulfilled for every wheel, then one of the three necessary conditions for drivability is fulfilled, otherwise the trajectory is not drivable.

Until now, external forces, gravity and inertia have not been considered. Instead, arbitrary force vector components $F_{X\,R,cg}$, $F_{Y\,R,cg}$, and $F_{Z\,R,cg}$, that operate at the center of gravity of the vehicle 1, and arbitrary torque vector components $M_{X\,R,cg}$, $M_{Y\,R,cg}$, and $M_{Z\,R,cg}$ were used as placeholders. In the following, external forces, gravity and inertia are introduced concerning the stationary influence of transverse incline and gradient as terms, which contribute to $F_{X\,R,cg}$, $F_{Y\,R,cg}$, $F_{Z\,R,cg}$ and $M_{X\,R,cg}$, $M_{Y\,R,cg}$, $M_{Z\,R,cg}$.

Concerning gravity, it follows from FIGS. 1 and 4 that $F_{Z,cg,gravity}=-m\cdot g$. Therefore:

$$F_{XR,cg,gravity} = \sin(\lambda) \cdot m \cdot g, \tag{96}$$

$$F_{YR,cg,gravity} = -\sin(\eta_{XR})\cos(\lambda) \cdot m \cdot g = -\sin(\eta) \cdot m \cdot g, \tag{97}$$

$$F_{ZR,cg,gravity} = -\cos(\eta_{XR})\cos(\lambda) \cdot m \cdot g = -\cos\left(\arcsin\left(\frac{\sin(\eta)}{\cos(\lambda)}\right)\right)\cos(\lambda) \cdot m \cdot g. \tag{98}$$

λ is positive when driving downhill.

Concerning translational inertia, it applies that:

In order to express the inertia forces, the accelerations $a_{X\ R,cg}$, $a_{Y\ R,cg}$, and $a_{Z\ R,cg}$ given in road surface plane coordinates must be calculated from the desired center of gravity trajectory accelerations $a_{X,cg}$ and $a_{Y,cg}$, which are projections in the X-Y plane of the intermediate axle system. Using the assumption of stationary transverse incline and gradient, the following applies:

$$a_{ZR,cg} = 0. \tag{99}$$

Therefore, the remaining unknowns are $a_{X\ R,cg}$ and $a_{Y\ R,cg}$ and also the movement $a_{Z,cg}$ of the vehicle 1, which is not given as part of the trajectory projections. Using (14), (15) and (99), the following can be determined:

$$a_{XR,cg} = \cos(\lambda)a_{X,cg} - \sin(\times)a_{Zc,g}, \tag{100}$$

$$a_{YR,cg} = \sin(\eta_{XR})\sin(\lambda)a_{X,cg} + \cos(\eta_{XR})a_{Y,cg} + \sin(\eta_{XR})\cos(\lambda)a_{Z,cg}, \tag{101}$$

$$0 = \cos(\eta_{XR})\sin(\lambda)a_{X,cg} - \sin(\eta_{XR})a_{Y,cg} + \cos(\eta_{XR})\cos(\lambda)a_{Z,cg}. \tag{102}$$

Solving (102) according to $a_{Z,cg}$ results in:

$$a_{Z,cg} = -\frac{> \sin(\lambda)}{\cos(\lambda)}a_{X,cg} + \frac{\sin(\eta_{XR})}{\cos(\eta_{XR})\cos(\lambda)}a_{Y,cg}. \tag{103}$$

Applying (103) in (100) results in:

$$a_{XR,cg} = \cos(\lambda)a_{X,cg} - \sin(\lambda)\left(-\frac{\sin(\lambda)}{\cos(\lambda)}a_{X,cg} + \frac{\sin(\eta_{XR})}{\cos(\eta_{XR})\cos(\lambda)}a_{Y,cg}\right), \tag{104}$$

$$a_{XR,cg} = \frac{1}{\cos(\lambda)}\underbrace{\left(\cos^2(\lambda) + \sin^2(\lambda)\right)}_{=1}a_{X,cg} - \frac{\sin(\eta_{XR})\sin(\lambda)}{\cos(\eta_{XR})\cos(\lambda)}a_{Y,cg}, \tag{105}$$

$$a_{XR,cg} = \frac{1}{\cos(\lambda)}a_{X,cg} - \frac{\sin(\eta_{XR})\sin(\lambda)}{\cos(\eta_{XR})\cos(\lambda)}a_{Y,cg}. \tag{106}$$

Applying (103) in (101) results in:

$$a_{YR,cg} = \sin(\eta_{XR})\sin(\lambda)a_{X,cg} + \cos(\eta_{XR})a_{Y,cg} \tag{107}$$

$$+\sin(\eta_{XR})\cos(\lambda)\left(-\frac{\sin(\lambda)}{\cos(\lambda)}a_{X,cg} + \frac{\sin(\eta_{XR})}{\cos(\eta_{XR})\cos(\lambda)}a_{Y,cg}\right), \tag{108}$$

$$a_{YR,cg} = \left(\cos(\eta_{Xr}) + \frac{\sin^2(\eta_{XR})}{\cos(\eta_{XR})}\right)a_{Y,cg}, \tag{109}$$

$$a_{YR,cg} = \frac{1}{\cos(\eta_{XR})}a_{y,cg}. \tag{110}$$

Finally, the translational inertia force vector components can be detected with (99), (106) and (110) as follows:

$$F_{XR,cg,inert,trans} = -m \cdot a_{XR,cg} = -\frac{m}{\cos(\lambda)}a_{X,cg} + m\frac{\sin(\eta_{XR})\sin(\lambda)}{\cos(\eta_{XR})\cos(\lambda)}a_{Y,cg}, \tag{111}$$

$$F_{YR,cg,inert,trans} = -m \cdot a_{YR,cg} = -\frac{m}{\cos(\eta_{XR})}a_{Y,cg}, \tag{112}$$

$$F_{ZR,cg,inert,trans} = -m \cdot a_{ZR,cg} = 0. \tag{113}$$

Concerning the rotational inertia, it applies that: In order to calculate the rotational torque $M_{X\ R,cg,inert,rot}$, $M_{Y\ R,cg,inert,rot}$, and $M_{Z\ R,cg,inert,rot}$ that is related to the rotational inertia, the rotational accelerations $\omega_{XR}$, $\omega_{\dot{Y}R}$ and $\omega_{\dot{Z}R}$ of the vehicle 1, which are given in road surface plane coordinates, must be expressed in terms of the desired trajectory of the center of gravity.

Using D. T. Greenwood, *Principles of Dynamics*, Prentice Hall, Upper Saddle River, US-NJ, 2nd edition, 1988, p. 406, the relationship between Euler angles and angular speeds is notated as in D. T. Greenwood, *Principles of Dynamics*, Prentice Hall, Upper Saddle River, US-NJ, $2^{nd}$ edition, 1988:

$$\omega_x = \phi - \psi\ \sin(\theta) \tag{114}$$

$$\omega_y = \theta\ \cos(\phi) + \psi\ \cos(\theta)\sin(\phi) \tag{115}$$

$$\omega_z - \psi\ \cos(\theta)\cos(\phi) - \sin(\phi) \tag{116}$$

Using the equivalents $$\omega_x \approx \omega_{XR}, \omega_y \approx \omega_{YR}, \omega_z \approx \omega_{ZR}, \tag{117}$$

$$\phi \approx \eta_{XR}, \theta \approx \lambda, \psi \approx \psi, \tag{118}$$

this translates into the notation of the present document:

$$\omega_{XR} = \dot{\eta}_{XR} - \psi\ \sin(\lambda) \tag{19}$$

$$\omega_{YR} = \dot{\lambda}\cos(\eta_{XR}) + \dot{\psi}\cos(\lambda)\sin(\eta_{XR}) \tag{120}$$

$$\omega_{ZR} = \dot{\psi}\cos(\lambda)\cos(\eta_{XR}) - \dot{\lambda}\text{sins}(\eta_{XR}) \tag{121}$$

Assuming steady conditions of slowly changing transverse incline and gradients, i.e. $\dot{\eta}_{X\ R} \approx 0'$ and $\dot{\lambda} \approx 0$, this leads to:

$$\omega_{XR} = -\psi\ \sin(\lambda) \tag{122}$$

$$\omega_{YR} = \dot{\psi}\cos(\lambda)\sin(\eta_{XR}) \tag{123}$$

$$\omega_{ZR} = \dot{\psi}\cos(\lambda)\cos(\eta_{XR}) \tag{124}$$

Taking into consideration the following relationship between the angular speed derivations $\dot{\omega}$ and $(\dot{\omega})_r$, if they are considered in an inert context and a moving context (see D. T. Greenwood, *Principles of Dynamics*, Prentice Hall, Upper Saddle River, US-NJ, $2^{nd}$ edition, 1988, p. 392):

$$\dot{\omega} = \underbrace{(\dot{\omega})_r}_{\text{as seen from moving frame}} + \underbrace{\omega \times \omega}_{=0}, = (\dot{\omega})_r, \tag{125}$$

the angular accelerations can be found by calculating the derivations of (122) to (124) using $\dot{\eta}_{X\ R} \approx 0'$ and $\dot{\lambda} \approx 0$:

$$\dot{\omega}_{XR} = -\ddot{\psi}\sin(\lambda) \tag{126}$$

$$\overline{\omega}_{YR} = \ddot{\psi}\cos(\lambda)\sin(\eta_{XR}) \tag{127}$$

$$\dot{\omega}_{ZR} = \ddot{\psi}\cos(\lambda)\cos(\eta_{XR}) \tag{128}$$

With Euler's equation of movement (D. T. Greenwood, *Principles of Dynamics*, Prentice Hall, Upper Saddle River, US-NJ, 2nd edition, 1988, p. 392) and also (122) to (124) and (126) to (128), it is possible to calculate the rotation torque resulting from the inertia:

$$M_{XR,cg,inert,rot}=-J_{xx}\dot{\omega}_{XR}-(J_{zz}-J_{yy})\omega_{YR}\omega_{ZR} \tag{129}$$

$$=+J_{zz}\ddot{\psi}\sin(\lambda)-(J_{zz}-J_{yy})\dot{\psi}^2\cos^2(\lambda)\sin(\eta_{XR})\cos(\eta_{XR}) \tag{130}$$

$$M_{YR,cg,inert,rot}=-J_{yy}\dot{\omega}_{YR}-(J_{xx}-J_{zz})\psi^2\sin(\lambda)\cos(\lambda)\cos(\eta_{XR}) \tag{131}$$

$$=-J_{yy}\ddot{\psi}\cos(\lambda)\sin(\eta_{XR})+(J_{xx}-J_{zz})\psi^2\sin(\lambda)\cos(\lambda)\cos(\eta_{XR}) \tag{132}$$

$$M_{ZR,cg,inert,rot}=-J_{zz}\dot{\omega}_{ZR}-(J_{yy}-J_{xx})\omega_{XR}\theta_{YR} \tag{133}$$

$$=-J_{zz}\ddot{\psi}\cos(\lambda)\cos(\eta_{XR})+(J_{yy}-J_{xx})\dot{\psi}^2\sin(\lambda)\cos(\lambda)\sin(\eta_{XR}) \tag{134}$$

Regarding the aerodynamic drag and lift, it is possible to express the contributions of aerodynamic drag (M. Mitschke, *Dynamik der Kraftfahrzeuge* [Motor vehicle dynamics], Springer, Berlin, DE, 5th edition, 2014.) to the arbitrary forces and torques operating at the center of gravity of the vehicle 1 by introducing the height of the traction lever arm $h_d$, which describes the resulting height of the drag forces above the ground:

$$F_{XR,cg,drag} = -\text{sgn}(v_{XR})C_d\frac{\rho_a}{2}A_a v_{XR}^2, \tag{135}$$

$$M_{YR,cg,drag} = (h_d - h_{cg})F_{XR,cg,drag} \tag{136}$$

$$= -(h_d - h_{cg})\text{sgn}(v_{XR})C_d\frac{\rho_a}{2}A_a v_{XR}^2. \tag{137}$$

$C_d$ hereby refers to the aerodynamic drag coefficients, $A_a$ to the aerodynamic surfaces and $\rho_a$ to the air density.

In a similar way, the aerodynamic lift (M. Mitschke, *Dynamik der Kraftfahrzeuge*, Springer, Berlin, DE, 5th edition, 2014.) is described by:

$$F_{ZR,cg,lift} = (C_{l,f} + C_{l,r})\frac{\rho_a}{2}A_a v_{XR}^2, \tag{138}$$

$$M_{YR,cg,lift} = (-l_f C_{l,f} + (l - l_f)C_{l,r})\frac{\rho_a}{2}A_a v_{XR}^2, \tag{139}$$

$C_{l,f}$ and $C_{l,r}$ hereby refer to front and rear aerodynamic lift coefficients.

Regarding the quasi-steady-state steering system model, it applies that: In order to assess the physical feasibility (=drivability) of a trajectory, steering force limitations are a further important aspect. Considering the tire forces, which are discussed above in the context of the equations (70) to (95), limitations of the steering system and of its power are discussed in the following. The assumptions of the model are met as discussed above.

The assessment of the drivability of trajectories is especially relevant at relatively high speeds. In this case, limitations of the steering force and steering rate must be considered in order to ensure the selection of drivable trajectories. Slow cornering and parking maneuvers can easily be handled by rescheduling, in the case that variations occur between desired and actual steering actuator movements.

For higher speeds and smaller steering angles, W. Matschinsky, *Radführungen der Straβenfahrzeuge* [Road vehicle wheel control], Springer, Berlin, DE, 3rd edition, 2007 states that the steering torque is dominated by lateral tire forces $F_{Y\,T,1L}$, $F_{Y\,T,1R}$, kinematics typically changes with the vertical wheel hub. The tire lag changes with the longitudinal tire slip and with the side-slip angle of the tire. The nearer the tire is to the slip conditions, the smaller the tire lag becomes.

When there are equal left and right driving/braking forces, as considered above, the influences of $F_{XT,1L}$ and $F_{XT,1R}$ on the steering force cancel each other out. Therefore, the necessary steering force is dominated by the contribution of the lateral forces $F_{Y\,T,1L}$ and $F_{Y\,T,1R}$ to the return torque. This leads to:

$$P_s = \underbrace{(n_{k,1L} + n_{p,1L})F_{YT,1L}}_{F_{YT,1L}\ \text{part of self aligning torque}}\dot{\delta}_{1L} + \underbrace{(n_{k,1R} + n_{p,1R})F_{YT,1R}}_{F_{YT,1R}\ \text{part of self aligning torque}}\dot{\delta}_{1R}. \tag{140}$$

Since kinematic lag $n_k$ and tire lag $n_p$ depend on the vertical wheel hub and slipping, a quasi-steady-state model, that does not take into consideration the chassis movement, stimuli from the road surface and slipping, is not capable of providing exact values for $n_k$ and $n_p$. It is, however, possible to calculate an upper limit $P_{s,\,max} \geq P_s$. With the definitions of the maximum kinematic lag $n_k$ and tire lag $n_p$ and the average steering rate $\dot{\delta}_{1,m}$ as follows:

$$n_{k,max} := \max(n_{k,1L}(\ \dots\ ), n_{k,1R}(\ \dots\ )), \tag{141}$$

$$n_{p,max} := \max(n_{p,1L}(\ \dots\ ), n_{p,1R}(\ \dots\ )), \tag{142}$$

$$\dot{\delta}_{1,m} := \frac{\dot{\delta}_{1L} + \dot{\delta}_{1R}}{2}, \tag{143}$$

the upper limit is given by:

$$P_{s,max}=(n_{k,max}+n_{p,max})(F_{YT,1L}+F_{YT,1R})\dot{\delta}_{1,m} \tag{144}$$

A further of the three necessary conditions of the drivability test thus needs to be tested, whether $P_{s,max}$ is below the presently available power of the electric power steering (EPS) $P_{EPS}$. If the inequation $P_{s,max} \leq P_{EPS}$ is fulfilled, then this necessary condition for drivability is fulfilled, otherwise the trajectory is not drivable.

Concerning the quasi-steady-state drive train model, it applies that: The core idea in order to assess the drivability limitations in the drive train is to compare the available traction and wheel power with the available force and power on the wheels (identifying delivery). Details of the definition of these terms are mentioned in M. Mitschke, *Dynamik der Kraftfahrzeuge*, Springer, Berlin, DE, 5th edition, 2014.

The traction requirement $F_{traction,demand}$ as defined in (145) is used in order to differentiate the following cases:

1. Driving: $F_{traction,demand} \geq 0$
2. Engine braking: $F_{traction,hyd\ brake\ threshold} < F_{traction,demand} < 0$
3. Engine braking and hydraulic braking: $F_{traction,demand} \leq F_{traction,hyd\ brake\ threshold}$ In order to model the required and available traction and wheel power, the following assumptions of the model are made.

The following aspects are taken into consideration:

acceleration resistance of the chassis and vehicle body acceleration resistance of the drive train gradient resistance two wheel drive, four wheel drive, four wheel drive with independent motors power losses due to wheel slippage power losses of the drive train electric actuator or internal combustion engine manual gearbox in steady conditions (power and force envelope curve for all gears)

roll resistance (without speed dependence)

degradation of the electric actuator (starting power, hourly performance, continuous power)

aerodynamic drag

The following aspects are disregarded:

gear shifting strategy and shifting process. For example, it is assumed that the gearbox controller chooses an appropriate gear in order to provide the required wheel power and traction, and that there is no significant loss of friction during the switching.

potential friction, i.e., the available traction only models the engine limits, friction limits are already taken into consideration with the tire force in the longitudinal direction.

electrical reinforcement of the internal combustion engine dual braking between the motor/electric actuator and hydraulic brake is provided, however is not yet modelled in detail.

Case 1: Driving

In the following considerations, an individual internal combustion engine or an individual electric actuator is provided. The approach can however be easily extended, in that the drive torque is distributed across several axles by means of the drive torque distribution factor.

According to M. Mitschke, *Dynamik der Kraftfahrzeuge*, Springer, Berlin, DE, 5th edition, 2014, the total traction requirement is given by:

$$F_{traction,demand}=f_R\cdot m\cdot g-F_{XR,cg}+(\lambda_m-1)\cdot m\cdot a_{XR,cg}, \quad (145)$$

with $f_R\cdot m\cdot g$ roll resistance $F_{X\,R,cg}$: total of the gradient resistance (96), chassis and vehicle body inertia (111) and of the aerodynamic drag (135), $(\lambda_m-1)\cdot m\cdot a_{X\,R,cg}$: acceleration resistance of the drive train with the mass factor $\lambda_m$ for rotatable masses.

The wheel power requirement without tire slippage loss is simply given by:

$$P_{traction,demand.w/o\ slip}=F_{traction,demand}\cdot v_{X\ R,cg} \quad (146)$$

The wheel power with tire slip is given by:

$$P_{traction,demand}=\frac{1}{\eta_{tire}}\cdot F_{traction,demand}\cdot v_{XR,cg},\text{ with }\eta_T:=\frac{r_d(1-s)}{r_s}, \quad (147)$$

and the following definitions:

$\eta_T$: describes tire efficiency, the losses as a result of longitudinal slip, s: average slip for the driven axle, assuming e.g. $s\approx s_{2L}=s_{2R}$ $r_d$: the dynamic wheel radius, with $$r_d=\frac{v}{2x}$$

and U as the distance that was covered on the ground by the moving wheel $r_s$: the static wheel radius, i.e. the distance from the center of the wheel to the road surface.

The following differences should be noted:

$2\pi*r_d$: distance that was covered on the ground by the slip-free wheel, $2\pi*r_d(1-s)$: distance that was covered on the ground by the slipping wheel, $2\pi*r_s$: distance that was covered on the ground by a point on the steady wheel with the radius $r_s$ For the quasi-steady-state vehicle model as described above, the longitudinal slip is unknown. When anti-slip control is switched on, the longitudinal slip is, in the worst case scenario, approximately the critical slip sc (M. Mitschke, *Dynamik der Kraftfahrzeuge*, Springer, Berlin, DE, 5th edition, 2014), typically around 10%. Therefore, a tire efficiency at the critical slippage can be calculated as follows:

$$\eta_{T,c}=\frac{r_d(1-s_c)}{r_s} \quad (148)$$

This leads to an upper limit approximation for $P_{traction,demand}$. A more detailed assessment could be achieved by interpolating $\eta_T$ between values of 1 to $\eta_{T,c}$, for example based on the friction limit utilization:

$$\text{friction limit utilization}:=\frac{1}{2}\left(\frac{F_{XT,2L}^2+\frac{F_{YT,2L}^2}{\mu_{ql}^2}}{\mu_{max}^2F_{ZT,eff,2L}^2}+\frac{F_{XT,2R}^2+\frac{F_{YT,2R}^2}{\mu_{ql}^2}}{\mu_{max}^2F_{ZT,eff,2R}^2}\right) \quad (149)$$

FIG. 9 shows schematic views of look-up tables LUT (characteristic delivery fields). $F_{traction,supply}$ and $P_{traction,supply}$ are given as look-up tables (characteristic delivery field) for an electric engine with a fixed gear transmission (continuous line) and for an internal combustion engine with a manual gearbox (dotted line). The supply look-up tables describe the traction and power that are available on the axle. This means they already take into consideration the drive train losses. In the case of a manual gearbox, the outer envelope curve is used for all gears. The look-up tables can be scaled according to the degradation DEG.

In order to determine drivability, $F_{traction,demand}$ and $P_{traction,demand}$ are compared to the envelope curves of $F_{traction,supply}$ and $P_{traction,supply}$, which are given as a (characteristic delivery field), as is illustrated in FIG. 9. The look-up tables already take into consideration the drive train losses, which are assumed to be modelled as constant efficiency factors for each gear. The degradation can be taken into consideration in that a reduction factor is used, which, for example, is based on engine temperature, power supply, etc.

If the inequations $F_{traction,supply}\geq F_{traction,demand}$ and $P_{traction,supply}\geq P_{traction,demand}$ are fulfilled, then the third necessary condition for drivability is fulfilled, otherwise the trajectory is not drivable.

Case 2: Engine Braking

A small negative traction requirement $F_{traction,demand}$ is realized, exclusively using engine braking. For a two-wheel-drive vehicle 1, this means that braking tire forces only occur on the front tires or the rear tires. Especially on surfaces with low friction, this can cause locking tires if no further measures are taken. Therefore, the control for the electronic stability program is needed in order to prevent locking tires. In this case, the hydraulic brakes are activated and case 2 skips over to case 3. This means that there is no restriction of the traction and traction supply besides the friction limits, wherein the friction limits are already taken into consideration in the longitudinal tire force (see above).

Case 3: Engine Braking and Hydraulic Braking

In this case, there is no restriction of the traction and traction supply besides the friction limits, wherein the friction limits are already taken into consideration in the longitudinal tire force (see above).

The following table 1 gives an overview of the vehicle parameters.

| Parameter | Unit | Description |
|---|---|---|
| m | kg | overall vehicle mass |
| I | m | wheelbase |
| $I_f$ | m | distance between the center of gravity and the front axle |
| $I_r$ | m | distance between the center of gravity and the rear axle ($I_r = I - I_f$) |
| $h_{cg}$ | m | height of the center of gravity |
| $h_{rf}$ | m | height of the front roll center |
| $h_{rr}$ | m | height of the rear roll center |
| $h_{rcg}$ | m | height of the roll center on the center of gravity ($h_{rcg} = h_{rr} + (h_{rf} - h_{rr})(1 - I_f/I)$) |
| $b_f$ | m | front track width |
| $b_r$ | m | rear track width |
| K | — | roll torque distribution between front and rear axle (1: only front, 0: only rear) |
| $\gamma_d$ | — | drive torque distribution between front and rear axle (1: only front, 0: only rear) |
| $\gamma_b$ | — | brake torque distribution between front and rear axle (1: only front, 0: only rear) |
| $k_{FZ}$ | — | wheel load digression factor ($0 \le k_{FZ} << 1$) |
| $F_{ZT,N,1R}, \ldots, F_{ZT,N,2L}$ | N | nominal wheel load in static load conditions |
| $\mu_{max}$ | — | potential friction |
| $\mu_{qI}$ | — | ratio of the lateral to the longitudinal grip (Idea: $\mu^2 F_z^2 = F_x^2 + F_y^2/\mu^2{}_{qI}I$) |
| $n_{k,max}$ | m | maximum kinematic lag |
| $n_{p,max}$ | m | maximum tire lag |
| $J_{xx}, J_{yy}, J_{zz}$ | kg $m^2$ | inertia torque of the vehicle 1 around the vehicle axles at the center of gravity |
| $C_d$ | — | aerodynamic drag coefficient |
| $A_a$ | $m^2$ | aerodynamic surface |
| $h_d$ | m | height of the traction lever arm |
| $C_{l,f}$ | — | aerodynamic lift coefficient, front |
| $C_{l,r}$ | — | aerodynamic lift coefficient, rear |
| $\rho_a$ | kg/$m^3$ | air density |
| $\lambda_m$ | — | mass factor for rotatable masses in the drive train (depending on the gear) |
| $f_R$ | — | roll resistance factor |
| $r_s$ | m | static wheel radius (distance from the center of the wheel to the road surface) |
| $r_d$ | m | dynamic wheel radius $U = 2\pi r_d$, U: distance that was covered by the moving wheel |
| $\eta_{T,c}$ | — | power efficiency of the tire with the critical slip |

FIG. 11 demonstrates the functional principle of the drivability testing FP for autonomous vehicles 1.

Input parameters are:

Vehicle trajectories to have their drivability examined.

The slope λ and transverse incline η of the street in front of the vehicle 1, for example from sensor or map data The potential friction value $\mu_{max}$ of the street, for example from sensor or map data Information about the degradation of the steering and drive actuator (available power/nominal power, available torque/nominal torque)

Output parameters are:

The assessment of the drivability (yes/no)

Optionally, a quantitative assessment of the exploitation of the potential friction value The technical signal processing occurs as follows: In a first step S1, a conversion of the requirements into target trajectory parameters (target position, target acceleration, target speed, target camber, target change in camber, etc.) as well as a conversion of the gradient and transverse incline into requirements in vehicle parameters (target traction, target tractive power, target steering power, target tire forces) is carried out. The conversion thereby occurs by means of an inverse vehicle model, for example the above-described quasi-steady-state model.

In a second step S2, a comparison of the requirements in vehicle parameters with the limits predetermined by the vehicle 1 and road is carried out, i.e.,:

a drive train limit check DTLC of whether the target traction and target tractive power are below the limits given by the characteristic traction curve and characteristic tractive power curve at the target speed, a steering limit check SLC of whether the target steering power is below the power limit of the steering, and a friction value limit check FLC of whether horizontal target tire forces are within the friction value limits (Kamm circle)

The limits in the second step can thereby be adjusted to the current available power with the assistance of information about degradation.

The result of the drivability test is finally aggregated and is described by a binary statement of “drivable/not drivable” for every trajectory analyzed. A more detailed evaluation of the drivability is conceivable by means of the calculation of the overshooting of the limit or of the still-available distance from the limit in percent. A possible example of feedback could appear as the following: tire force too high on the front left, 120% of the potential friction value used. This extension offers the advantage of providing more detailed auxiliary information for planning trajectories.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERALS LIST

1 vehicle
1L left front wheel
1R right front wheel
2L left rear wheel
2R right rear wheel
$b_f$ track width of the front axle
DEG degradation
DTLC drive train limit check
FLC friction value limit check
FRC front roll center, roll center of the front axle
FP drivability testing
$F_{traction,supply}$ available traction $F_{X\,R,cg}$, $F_{Y\,R,cg}$, $F_{Z\,R,cg}$ force vector components
$F_{X\,R,f}$, $F_{X\,R,r}$, $F_{Z\,R,r}$ axial forces
$F_{X\,R,R1}$, $F_{Z\,R,R1}$, tire forces
$F_{X\,R,L1}$, $F_{Z\,R,L1}$, tire forces
$F_{X\,R,R2}$, $F_{Z\,R,R2}$, tire forces
$F_{X\,R,L2}$, $F_{Z\,R,L2}$, tire forces
$F_{Y\,R,1L}$, $F_{Z\,R,1L}$, tire forces
$F_{Y\,R,1R}$, $F_{Z\,R,1R}$ tire forces
$F_{X\,T}$, $F_{Y\,T}$ horizontal target tire forces
$F_{Y\,R,1}$, $F_{Z\,R,1}$ chassis reaction forces
$F_{z,eff}$ effective tire load
$h_{cg}$ height of the center of gravity
$h_{rcg}$ height of the roll center at the $x_R$ position of the center of gravity
$h_{rf}$ height of the roll center of the front axle
I wheelbase
$I_f$ space between the center of gravity and the front axle
LUT look-up table
LTM long-term storage
$M_{X\,R,cg}$, $M_{Y\,R,cg}$, $M_{Z\,R,cg}$ torque vector components
$M_{XR,1}$ chassis reaction torque
$P_{traction,supply}$ available tractive power
RA roll axle
$RC_{cg}$ roll center at the $x_R$ position of the center of gravity
RRC rear roll center
S1 first step
S2 second step
SLC steering limit check
$v_{XR,cg}$ longitudinal speed in the center of gravity
X, Y, Z intermediate axle system
$X_E$, $Y_E$, $Z_E$ fixed axle system
$X_R$, $Y_R$, $Z_R$ road surface plane axle system, road axle system
$X_{T,1L}$, $Y_{T,1L}$, $Z_{T,1L}$ tire axle system
$X_V$, $Y_V$, $Z_V$ vehicle axle system
X', Y', Z' auxiliary axle system
$\delta_{1L}$, $\delta_{1R}$ steering angle
$\eta$ road surface-level camber angle, transverse incline
$\eta_{X\,R}$ angle
$\theta$ angle of incline
$\lambda$ road surface slope angle, road surface-level slope, slope
$\mu_{max}$ potential friction value, friction value
$\mu$ql ratio of the lateral grip to the longitudinal grip
$\varphi$ roll angle
$\varphi$V vehicle roll angle
$\psi$ yaw angle

The invention claimed is:

1. A method for checking the suitability of a target trajectory for trajectory control of a vehicle, the method comprising:
- detecting or estimating, by a control unit in the vehicle, a slope, a transverse incline, and a friction value of a road surface along the target trajectory using sensors or map data, wherein the target trajectory contains route information about the path of a route to be driven and momentum information about momentum with which the route should be driven;
- calculating, by the control unit, target values required for driving the target trajectory of target traction, target tractive power, target steering power, and horizontal target tire forces on individual wheels of the vehicle based on model equations of the vehicle from the route information and momentum information about the target trajectory and from the detected slope and transverse incline,
- wherein the target trajectory is assessed as suitable for the trajectory control if:
  - the target traction and target tractive power are below a predetermined characteristic traction curve or characteristic tractive power curve,
  - the target steering power is below a predetermined power limit of the steering, and
  - the horizontal target tire forces on each wheel are within the friction value limits determined by the friction value,
- wherein the target trajectory is otherwise assessed to be unsuitable; and
- controlling, by the vehicle, a trajectory of the vehicle along the target trajectory using the target trajectory assessed as suitable for trajectory control.

2. The method of claim 1, wherein the method is performed on every target trajectory from a predetermined plurality of target trajectories.

3. The method of claim 1, wherein every target trajectory assessed as unsuitable is rejected as invalid.

4. The method of claim 1, wherein the predetermined characteristic traction curve and the characteristic tractive power curve are obtained from respective look-up tables.

5. The method of claim 4, wherein the predetermined characteristic traction curve and the characteristic tractive power curve take into consideration occurrences of degradation of a drive train of the vehicle.

6. The method of claim 1, further comprising:
- performing a quantitative assessment of exploitation of a potential friction value.

7. The method of claim 1, wherein occurrences of degradation of a steering actuator are taken into consideration.

8. The method of claim 1, wherein the model equations of the vehicle rely on a quasi-steady-state modelling approach.

9. The method of claim 1, wherein in a first step, parameters of the target trajectory, the slope, and the transverse incline are converted into vehicle parameters using the model equations.

10. A vehicle comprising:
- a control unit configured to check the suitability of a target trajectory for trajectory control of a vehicle, wherein the control unit is configured to
  - detect or estimate a slope, a transverse incline, and a friction value of a road surface along the target trajectory using sensors or map data, wherein the target trajectory contains route information about the path of a route to be driven and momentum information about momentum with which the route should be driven;
  - calculate target values required for driving the target trajectory of target traction, target tractive power, target steering power, and horizontal target tire forces on individual wheels of the vehicle based on model equations of the vehicle from the route information and momentum information about the target trajectory and from the detected slope and transverse incline,
  - wherein the target trajectory is assessed as suitable for the trajectory control if:
    - the target traction and target tractive power are below a predetermined characteristic traction curve or characteristic tractive power curve,
    - the target steering power is below a predetermined power limit of the steering, and
    - the horizontal target tire forces on each wheel are within the friction value limits determined by the friction value,
  - wherein the target trajectory is otherwise assessed to be unsuitable; and wherein the vehicle is configured to control a trajectory of the vehicle along the target trajectory using the target trajectory assessed as suitable for trajectory control.

* * * * *